US012664406B2

(12) United States Patent
Park et al.

(10) Patent No.: US 12,664,406 B2
(45) Date of Patent: Jun. 23, 2026

(54) METHOD OF CORRECTING IMAGE BY USING NEURAL NETWORK MODEL, AND COMPUTING DEVICE FOR EXECUTING NEURAL NETWORK MODEL FOR IMAGE CORRECTION

(71) Applicant: SAMSUNG ELECTRONICS CO., LTD., Suwon-si (KR)

(72) Inventors: Pilkyu Park, Suwon-si (KR); Jaehwan Kim, Suwon-si (KR); Heechul Yang, Suwon-si (KR); Jongseok Lee, Suwon-si (KR); Chaeeun Lee, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 18/220,008

(22) Filed: Jul. 10, 2023

(65) Prior Publication Data

US 2023/0385986 A1    Nov. 30, 2023

Related U.S. Application Data

(63) Continuation of application No. PCT/KR2023/007295, filed on May 26, 2023.

(30) Foreign Application Priority Data

May 27, 2022    (KR) ........................ 10-2022-0065554
Oct. 27, 2022    (KR) ........................ 10-2022-0140507

(51) Int. Cl.
*G06N 3/045*        (2023.01)
*G06T 5/60*        (2024.01)

(52) U.S. Cl.
CPC ............... *G06N 3/045* (2023.01); *G06T 5/60* (2024.01); *G06T 2207/20081* (2013.01); *G06T 2207/20084* (2013.01)

(58) Field of Classification Search
None
See application file for complete search history.

(56) References Cited

U.S. PATENT DOCUMENTS 10,614,347 B2    4/2020    Merrill et al.
11,042,789 B2    6/2021    Lee
(Continued)

FOREIGN PATENT DOCUMENTS

CN    111028182 A    4/2020
JP    2022-25360 A    2/2022
(Continued)

OTHER PUBLICATIONS

Communication issued Mar. 26, 2025 by the European Patent Office in European Patent Application No. 23812205.5.
(Continued)

*Primary Examiner* — Lennin R Rodriguezgonzalez
(74) *Attorney, Agent, or Firm* — Sughrue Mion, PLLC

(57) ABSTRACT

A method of correcting an image includes: inputting an input image and a correction parameter to a first neural network model; and obtaining an inference image from the first neural network model, the inference image corresponding to the correction parameter. The first neural network model is a model trained to minimize a difference between the inference image that is output after the input image and the correction parameter are input and a label image corresponding to the correction parameter. The label image is an image obtained by, when the correction parameter is applied to at least one image correction algorithm, correcting the input image by using the at least one image correction algorithm.

20 Claims, 23 Drawing Sheets

(56)            References Cited

U.S. PATENT DOCUMENTS

| | | |
|---|---|---|
| 11,178,368 B2 | 11/2021 | Gera et al. |
| 2019/0228273 A1 * | 7/2019 | Merrill .................... G06T 11/60 |
| 2021/0232863 A1 | 7/2021 | Seo et al. |
| 2021/0241167 A1 | 8/2021 | Li et al. |
| 2021/0271938 A1 * | 9/2021 | Lee ........................ G06V 10/82 |
| 2021/0350513 A1 | 11/2021 | Takahashi et al. |
| 2022/0076374 A1 | 3/2022 | Li et al. |
| 2022/0122306 A1 | 4/2022 | Lin et al. |
| 2022/0198628 A1 | 6/2022 | Dinh et al. |

FOREIGN PATENT DOCUMENTS

| | | |
|---|---|---|
| KR | 10-2020-0126327 A | 11/2020 |
| KR | 10-2021-0147662 A | 12/2021 |
| KR | 10-2366187 B1 | 2/2022 |
| KR | 10-2022-0049702 A | 4/2022 |
| WO | 2021/221855 A1 | 11/2021 |

OTHER PUBLICATIONS

International Search Report and Written Opinion (PCT/ISA/210 & 237) dated Aug. 31, 2023 issued by the International Searching Authority in counterpart International Application No. PCT/KR2023/007295.
Communication issued on Dec. 22, 2025 by the European Patent Office in European Patent Application No. 23812205.5.

* cited by examiner

Strength

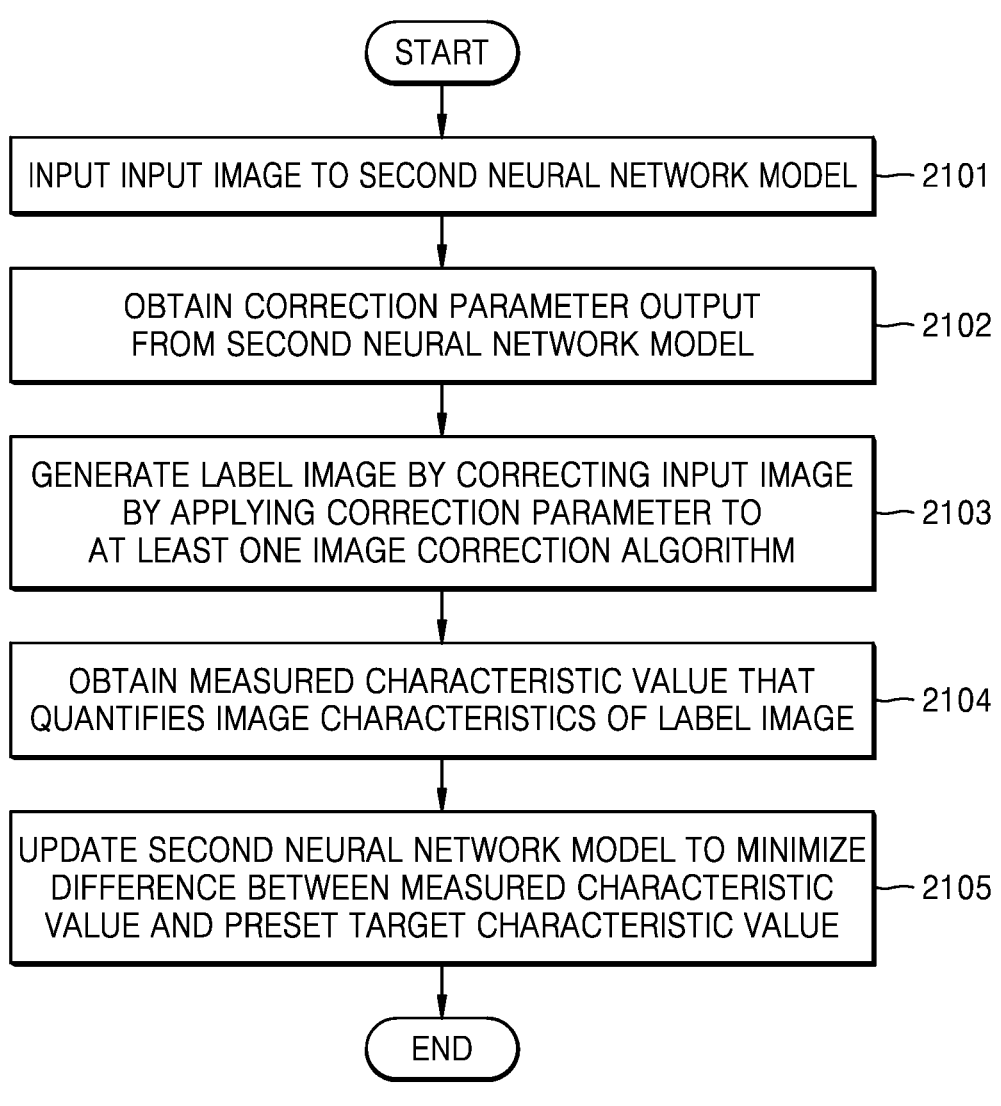

START

INPUT INPUT IMAGE TO SECOND NEURAL NETWORK MODEL — 2101

OBTAIN CORRECTION PARAMETER OUTPUT
FROM SECOND NEURAL NETWORK MODEL — 2102

GENERATE LABEL IMAGE BY CORRECTING INPUT IMAGE
BY APPLYING CORRECTION PARAMETER TO
AT LEAST ONE IMAGE CORRECTION ALGORITHM — 2103

OBTAIN MEASURED CHARACTERISTIC VALUE THAT
QUANTIFIES IMAGE CHARACTERISTICS OF LABEL IMAGE — 2104

UPDATE SECOND NEURAL NETWORK MODEL TO MINIMIZE
DIFFERENCE BETWEEN MEASURED CHARACTERISTIC
VALUE AND PRESET TARGET CHARACTERISTIC VALUE — 2105

END

METHOD OF CORRECTING IMAGE BY USING NEURAL NETWORK MODEL, AND COMPUTING DEVICE FOR EXECUTING NEURAL NETWORK MODEL FOR IMAGE CORRECTION

CROSS REFERENCE TO RELATED APPLICATIONS

This application is a continuation of PCT/KR2023/007295, designating the United States, filed May 26, 2023, in the Korean Intellectual Property Receiving Office, which claims priority to Korean Patent Application No. 10-2022-0065554, filed on May 27, 2022, in the Korean Intellectual Property Office, and Korean Patent Application No. 10-2022-0140507, filed on Oct. 27, 2022, in the Korean Intellectual Property Office. The disclosures of each of these applications are incorporated herein in their entireties.

TECHNICAL FIELD

The disclosure relates to a method of correcting an image by using a neural network model and a computing device for executing the neural network model for image correction.

BACKGROUND

With the recent development of neural network technology, neural networks have been used in various fields. In particular, with neural networks being used in the field of image signal processing to perform image correction or reconstruction, processing speed and image characteristics have improved.

SUMMARY

According to an embodiment of the disclosure, a method of correcting an image by using a neural network model includes inputting, by a processor of a computing device, an input image and a correction parameter to a first neural network model, and obtaining, by the processor, an inference image corresponding to the correction parameter from the first neural network model, wherein the first neural network model is a model trained to minimize a difference between the inference image output when the input image and the correction parameter are input and a label image corresponding to the correction parameter, wherein the label image corresponding to the correction parameter is an image obtained by, when the correction parameter is applied to at least one image correction algorithm, correcting the input image by using the at least one image correction algorithm, wherein the first neural network model is trained on a relationship between the correction parameter and the label image so that the inference image output from the first neural network model is controllable by changing the correction parameter.

According to an embodiment of the disclosure, a computing device includes an input/output interface through which an input is received from a user, a memory in which a program for correcting an input image is stored, and a processor configured to execute the program to input an input image and a correction parameter to a first neural network model, and obtain an inference image corresponding to the correction parameter from the first neural network model, wherein the first neural network model is a model trained to minimize a difference between the inference image output when the input image and the correction parameter are input and a label image corresponding to the correction parameter, wherein the label image corresponding to the correction parameter is an image obtained by, when the correction parameter is applied to at least one image correction algorithm, correcting the input image by using the at least one image correction algorithm, wherein the first neural network model is trained on a relationship between the correction parameter and the label image so that the inference image output from the first neural network model is controllable by changing the correction parameter.

According to an embodiment of the disclosure, a computer-readable recording medium has stored therein a program for performing at least one of embodiments of the method, on a computer.

According to an embodiment of the disclosure, a computer program is stored in a medium so as to perform at least one of embodiments of the method, on a computer.

BRIEF DESCRIPTION OF DRAWINGS

FIG. 3 is a diagram for describing a process of training the first neural network model, according to an embodiment of the disclosure.

FIG. 4 is a diagram for describing a process of training the second neural network model, according to an embodiment of the disclosure.

FIG. 8 is a view for describing an a value applied to an exposure fusion algorithm, according to an embodiment of the disclosure.

FIGS. 20 and 21 are flowcharts for describing a method of training the first neural network model and the second neural network model, according to an embodiment of the disclosure.

DETAILED DESCRIPTION

Figure 1:
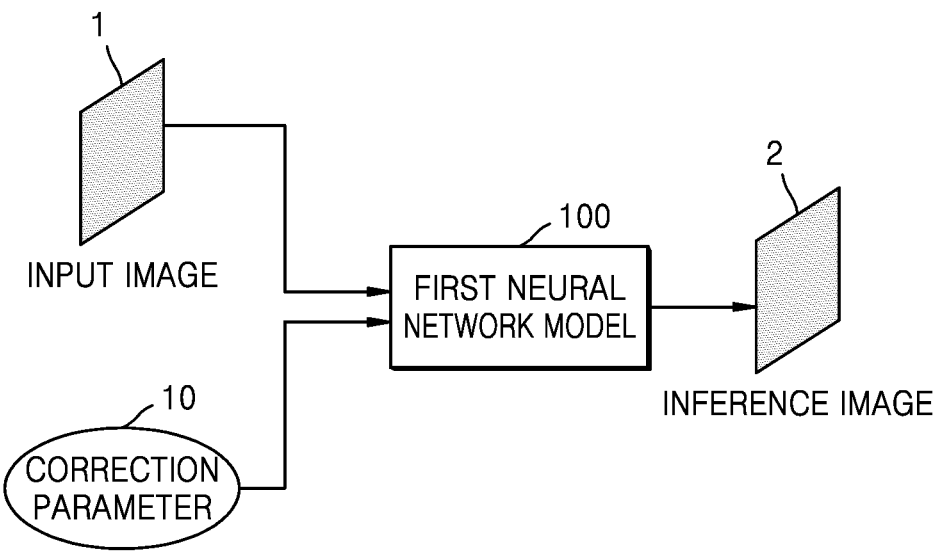
FIG. 1 is a diagram for describing an operation of a first neural network model, according to an embodiment of the disclosure.

Throughout the disclosure, the expression "at least one of a, b or c" indicates only a, only b, only c, both a and b, both a and c, both b and c, all of a, b, and c, or variations thereof.

In this detailed description, descriptions of techniques that are well known in the art and not directly related to the disclosed embodiments are omitted. This is to clearly convey the gist of the disclosed embodiments by omitting an unnecessary description. The terms used herein are those defined in consideration of functions in the disclosed embodiments, and may vary according to the intention of users or operators, precedents, etc. Hence, the terms used herein should be defined based on the meaning of the terms together with the descriptions throughout the specification.

For the same reason, some elements in the accompanying drawings are exaggerated, omitted, or schematically illustrated. In addition, the size of each element may not substantially reflect its actual size. In each drawing, the same or corresponding element is denoted by the same reference numeral.

The advantages and features of the disclosed embodiments, and methods of achieving the same, will become apparent with reference to the embodiments described below in detail in conjunction with the accompanying drawings. The disclosed embodiments may, however, be embodied in many different forms and should not be construed as limited to any particular disclosed embodiment set forth herein. The embodiments are provided so that this detailed description will be thorough and complete, and will fully convey the scope of the disclosed embodiments to one of ordinary skill in the art. An embodiment may be defined according to the claims. In the specification, the same reference numerals denote the same elements. Detailed descriptions of related well-known functions or configurations that may blur the points of the disclosed embodiments are omitted. The terms used herein are those defined in consideration of functions, and may vary according to the intention of users or operators, precedents, etc. Hence, the terms used herein should be defined based on the meaning of the terms together with the descriptions throughout the specification.

It will be understood that each block of flowchart illustrations and combinations of blocks in the flowchart illustrations may be implemented by computer program instructions. These computer program instructions may be loaded into a processor of a general-purpose computer, special purpose computer, or other programmable data processing apparatus, and the instructions, which are executed via the processor of the computer or other programmable data processing apparatus may generate means for implementing the functions specified in the flowchart block(s). These computer program instructions may also be stored in a computer usable or computer-readable memory that may direct a computer or other programmable data processing apparatus to function in a particular manner, and the instructions stored in the computer usable or computer-readable memory may produce an article of manufacture including instruction means that implement the functions specified in the flowchart block(s). The computer program instructions may also be loaded onto a computer or other programmable data processing apparatus.

Also, each block of the flowchart illustrations may represent a module, segment, or portion of code, which includes one or more executable instructions for implementing the specified logical function(s). It should also be noted that the functions noted in the blocks may occur out of the order shown. For example, two blocks shown in succession may in fact be executed substantially concurrently or the blocks may sometimes be executed in the reverse order, depending upon the functionality involved.

The term " . . . unit" used in the present embodiment refers to a software or hardware component, such as a field-programmable gate array (FPGA) or an application-specific integrated circuit (ASIC), which performs certain tasks. However, " . . . unit" does not mean to be limited to software or hardware. A " . . . unit" may be configured to be in an addressable storage medium or may be configured to operate one or more processors. In the disclosed embodiments, " . . . unit" may include components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and " . . . units" may be combined into fewer components and " . . . units" or further separated into additional components and " . . . units". Also, a " . . . unit" may include one or more processors.

An embodiment relates to a method of correcting an image by using a neural network model. Before a specific embodiment is described, the meaning of terms frequently used in this specification is defined.

An 'input image' refers to an image input to a neural network model, and an 'inference image' refers to an image output after the neural network model corrects the input image. An input image may be a linear RGB image generated from a plurality of raw images. A 'raw image' may be an image output from an image sensor (e.g., a charge-coupled device (CCD) sensor or a complementary metal-oxide-semiconductor (CMOS) sensor), and may refer to a Bayer format image having only one color channel per pixel. Also, for a plurality of raw images captured before and after a specific point of time, one linear RGB image may be obtained by using temporal information of the raw images and performing demosaicing and denoising.

'Image characteristics' may refer to a brightness, contrast, color temperature, etc. of an image.

'Image correction' may refer to an operation of adjusting characteristics of an image, and an 'image correction algorithm' refers to an algorithm for adjusting characteristics of an image.

A 'correction parameter' may refer to a parameter applied to an image correction algorithm when an image is corrected by using the image correction algorithm. That is, a degree to which characteristics of an image are adjusted may be determined according to a value of a correction parameter. Specific examples of a correction parameter will be described below.

A 'label image' may be an image used as training data for performing supervised learning on a neural network model, and in particular, refers to an image used as ground truth data. A 'label image generation module' may be an element that generates a label image by correcting an input image by using at least one image correction algorithm.

A neural network according to an embodiment of the disclosure may include a 'first neural network model' that corrects an input image and outputs an inference image and a 'second neural network model' that infers an optimal correction parameter for a given input image. How the first neural network and the second neural network may be used in an actual device will be described in detail with reference to FIGS. 10 and 11.

1. Description of Basic Operations of a First Neural Network Model and a Second Neural Network Model First, functions of a first neural network model 100 and a second neural network model 200 will be briefly described with reference to FIGS. 1 and 2, and then how to train the first neural network model 100 and the second neural network model 200 to perform the functions will be described with reference to FIGS. 3 and 4.

FIG. 1 is a diagram for describing an operation of the first neural network model 100, according to an embodiment of the disclosure. Referring to FIG. 1, the first neural network model 100 may receive an input image 1 and a correction parameter 10, and may output an inference image 2 corresponding to the correction parameter 10. In this case, the inference image 2 corresponds to an image obtained by correcting the input image 1 based on the correction parameter 10. How the first neural network model 100 is trained to output the inference image 2 will be described below in detail with reference to FIG. 3.

In general, the input image 1 may have a problem in that the whole or a part of the image is dark or a contrast is low, and thus, an object in the image is not well recognized. The first neural network model 100 may increase a brightness of the input image 1 or enhance a contrast of the input image 1 to solve the problem.

The first neural network model 100 may output the inference image 2 as shown in FIG. 1, but the first neural network model 100 may output a filter or map information used to convert the input image 1 into the inference image 2 without outputting the image itself. That is, the input image 1 may be converted into the inference image 2 by using the filter or the map information output by the first neural network model 100.

The first neural network model 100 may include any of various types of deep learning networks, and may be implemented as, for example, but not limited to, a residual network (ResNet) that is a type of convolutional neural network (CNN).

Figure 2:
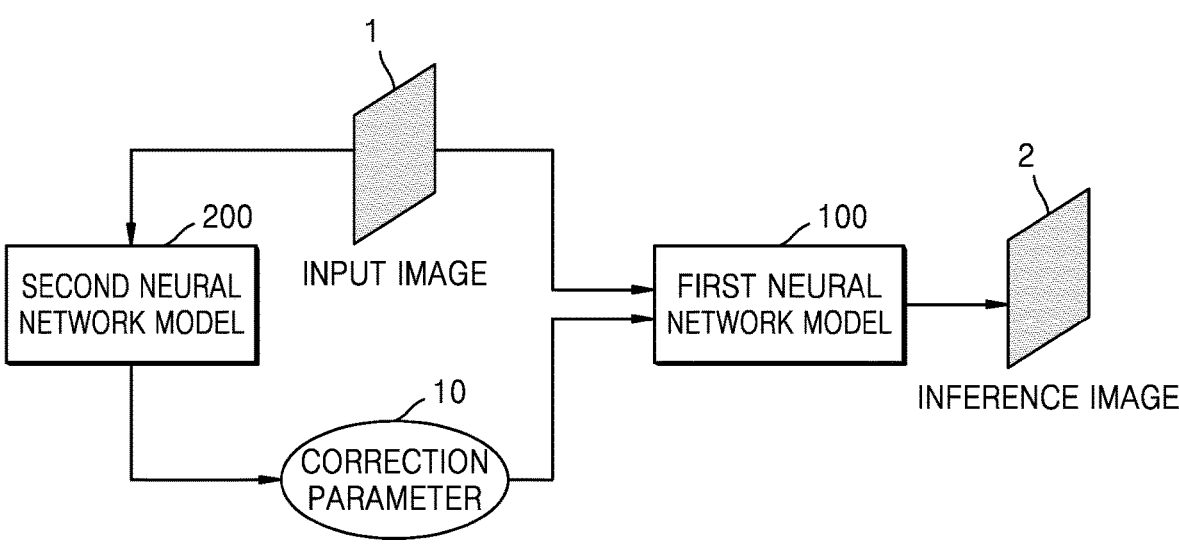
FIG. 2 is a diagram for describing an operation of a second neural network model, according to an embodiment of the disclosure.

FIG. 2 is a diagram for describing an operation of the second neural network model 200, according to an embodiment of the disclosure. Referring to FIG. 2, the second neural network model 200 may receive the input image 1 and may infer and output the correction parameter 10. The correction parameter 10 output from the second neural network model 200 may be input to the first neural network model 100, and the first neural network model 100 may output the inference image 2 corresponding to the correction parameter 10 as described above with reference to FIG. 1.

The second neural network model 200 may infer the correction parameter 10 for correcting the input image 1 to have image characteristics that a user may like. In this case, how the input image 1 is corrected by the correction parameter 10 inferred by the second neural network model 200 may be determined in a process of training the second neural network model 200, which will be described below in detail with reference to FIG. 4.

The second neural network model 200 may include any of various types of deep learning networks, and may be implemented as, for example, but not limited to, ResNet that is a type of CNN.

2. (Process of Training) Method of Training the First Neural Network Model and the Second Neural Network Model A method of training the first neural network model 100 and the second neural network model 200 will be described with reference to FIGS. 3 and 4.

According to an embodiment of the disclosure, the first and second neural network models 100 and 200 may be trained by an external device (e.g., a computing device 1800 of FIG. 18), rather than a device (e.g., a mobile terminal 1000 of FIG. 10) on which the first and second neural network models 100 and 200 are mounted. However, the device on which the first and second neural network models 100 and 200 are mounted may train the first and second neural network models 100 and 200. For convenience of explanation, it is assumed that a processor 1830 of the computing device 1800 of FIG. 18 executes a program stored in a memory 1820 to train the first and second neural network models 100 and 200 described with reference to FIGS. 3 and 4. That is, in FIGS. 3 and 4, operations performed by a label image generation module 300 or an optimizer 400 and calculation of a loss function may be actually performed by the processor 1830 of the computing device 1800 of FIG. 18.

Figure 18:
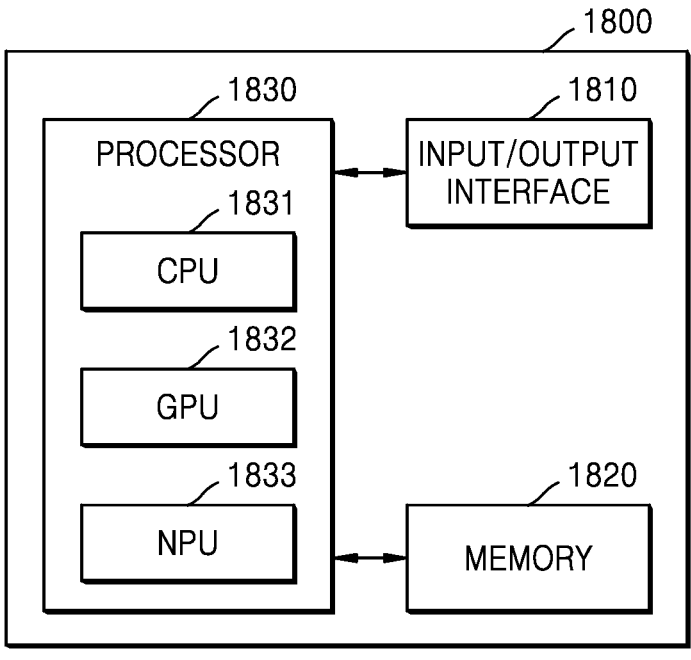
FIG. 18 is a block diagram illustrating a configuration of a computing device for performing training on the first and second neural network models, according to an embodiment of the disclosure.

The processor 1830 of the computing device 1800 of FIG. 18 may include a central processing unit (CPU) 1831, a graphics processing unit (GPU) 1832, and a neural processing unit (NPU) 1833, and may execute a program stored in the memory 1820 by using at least one of the CPU 1831, the GPU 1832, or the NPU 1833 to train the first and second neural network models 100 and 200. An input/output interface 1810 of the computing device 1800 may receive a command related to training of the first and second neural network models 100 and 200 or may display information.

Figure 3:
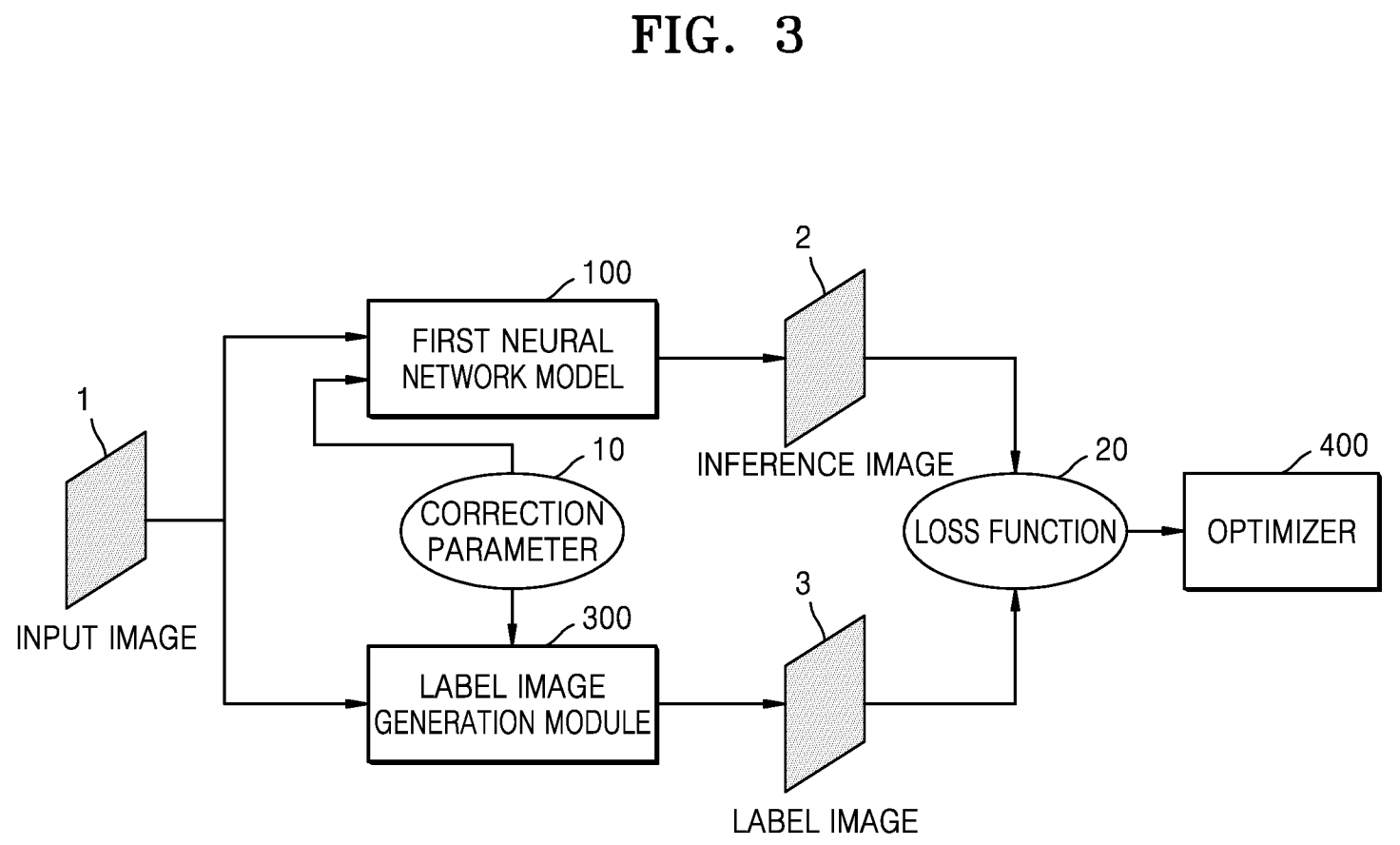

FIG. 3 is a diagram for describing a process of training the first neural network model 100, according to an embodiment of the disclosure. Referring to FIG. 3, the label image generation module 300 may output a label image 3 obtained by correcting the input image 1 by using at least one image correction algorithm. The correction parameter 10 is applied to the image correction algorithm when the label image generation module 300 corrects the input image 1. The image correction algorithm used by the label image generation module 300 and the correction parameter 10 will be described in detail with reference to FIG. 5 to FIG. 8.

Figure 5:
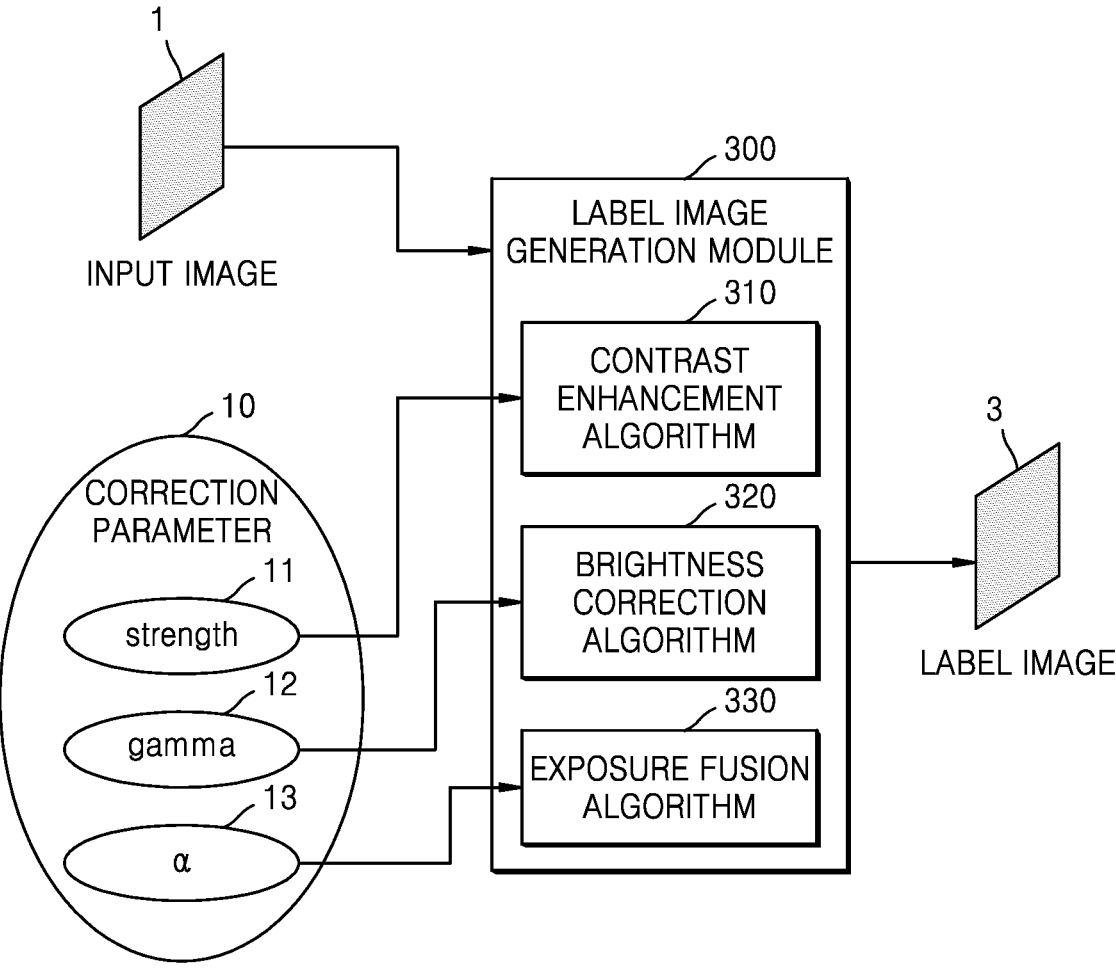
FIG. 5 is a diagram for describing a process in which a label image generation module generates a label image from an input image, according to an embodiment of the disclosure.

FIG. 5 is a diagram for describing a process in which the label image generation module 300 generates the label image 3 from the input image 1, according to an embodiment of the disclosure. Referring to FIG. 5, the label image generation module 300 may use a contrast enhancement algorithm 310, a brightness correction algorithm 320, and an exposure fusion algorithm 330. However, the image correction algorithms used by the label image generation module 300 of FIG. 5 are merely examples, and the label image generation module 300 may use various other types of image correction algorithms.

FIG. 5 illustrate which parameters are specifically included in the correction parameter 10 and which image correction algorithm corresponds to each parameter. Referring to FIG. 5, a strength value 11 may be applied to the contrast enhancement algorithm 310, a gamma value 12 may be applied to the brightness correction algorithm 320, and an a value 13 may be applied to the exposure fusion algorithm 330. The parameters (e.g., 11, 12, and 13) respectively applied to the image correction algorithms will be described with reference to FIGS. 6 to 8.

Figure 6:
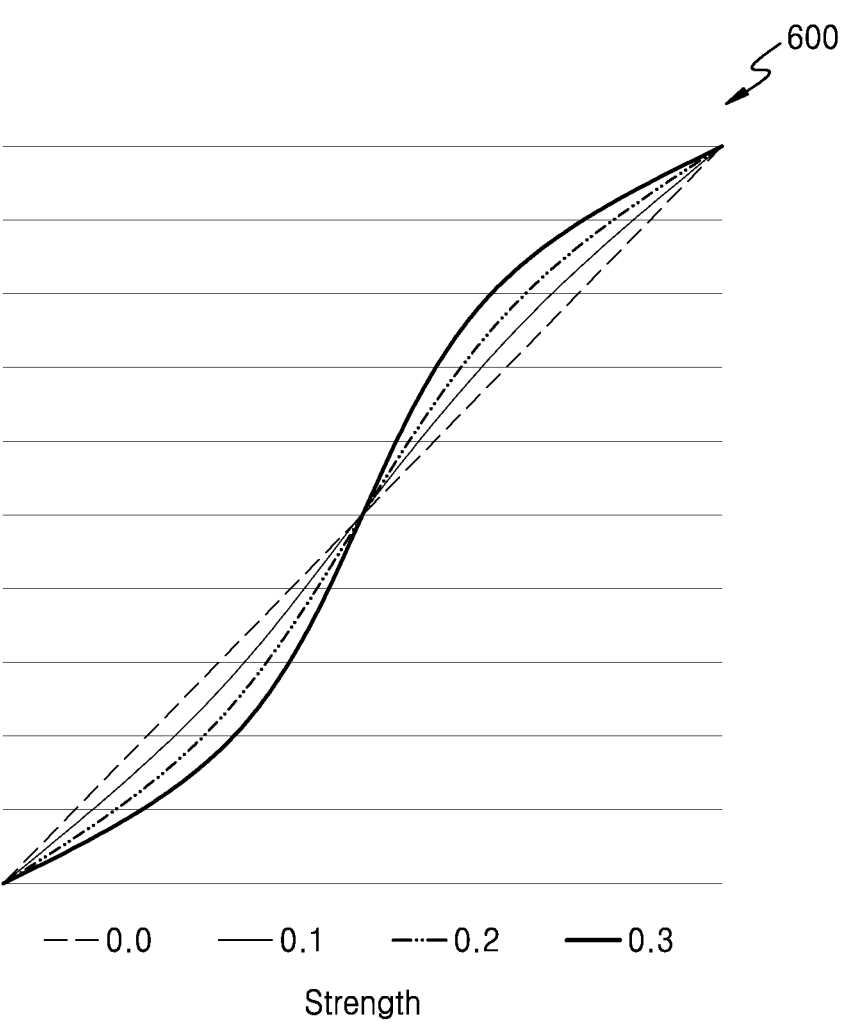
FIG. 6 is a diagram for describing a strength value applied to a contrast enhancement algorithm, according to an embodiment of the disclosure.

FIG. 6 is a diagram for describing the strength value 11 applied to the contrast enhancement algorithm 310, according to an embodiment of the disclosure. The contrast enhancement algorithm 310 may be a method of adjusting a contrast by using a curve.

Referring to a graph 600 of FIG. 6, it is found that a curvature of an S-curve changes according to the strength value 11, and in particular, a curvature of the S-curve increases as the strength value 11 increases. When a slope of the S-curve increases, a tone is stretched, and thus, a contrast increases. Accordingly, as the strength value 11 increases, the contrast enhancement algorithm 310 may increase a contrast of the input image 1.

Figure 7:
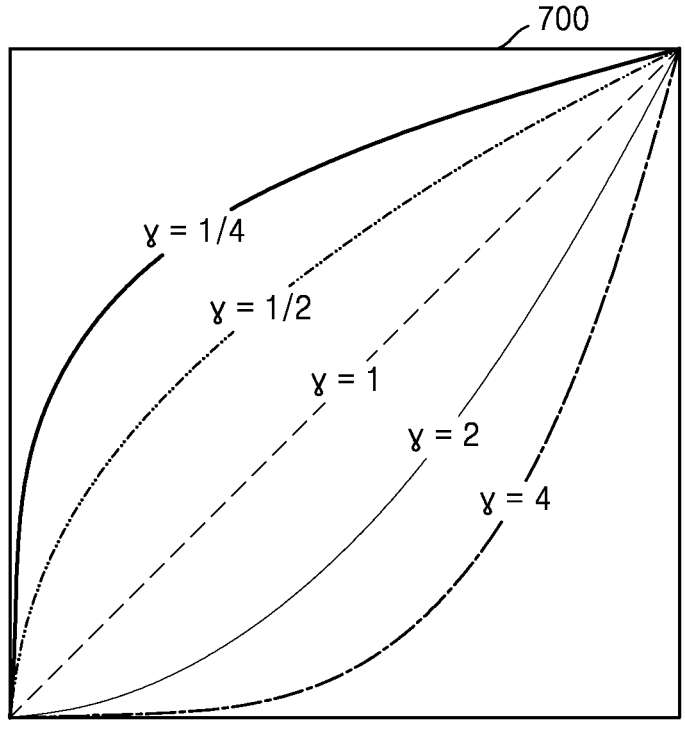
FIG. 7 is a diagram for describing a gamma value applied to a brightness correction algorithm, according to an embodiment of the disclosure.

FIG. 7 is a diagram for describing the gamma value 12 applied to the brightness correction algorithm 320, according to an embodiment of the disclosure. In a graph 700 of FIG. 7, a gamma curve according to the gamma value 12 is shown. An x-axis of the graph 700 represents a contrast value, and a y-axis represents a brightness. Referring to the graph 700 of FIG. 7, it is found that as the gamma value 12 decreases, the brightness increases. Accordingly, as the gamma value 12 decreases, the brightness correction algorithm 320 may increase the brightness of the input image 1.

Figure 8:
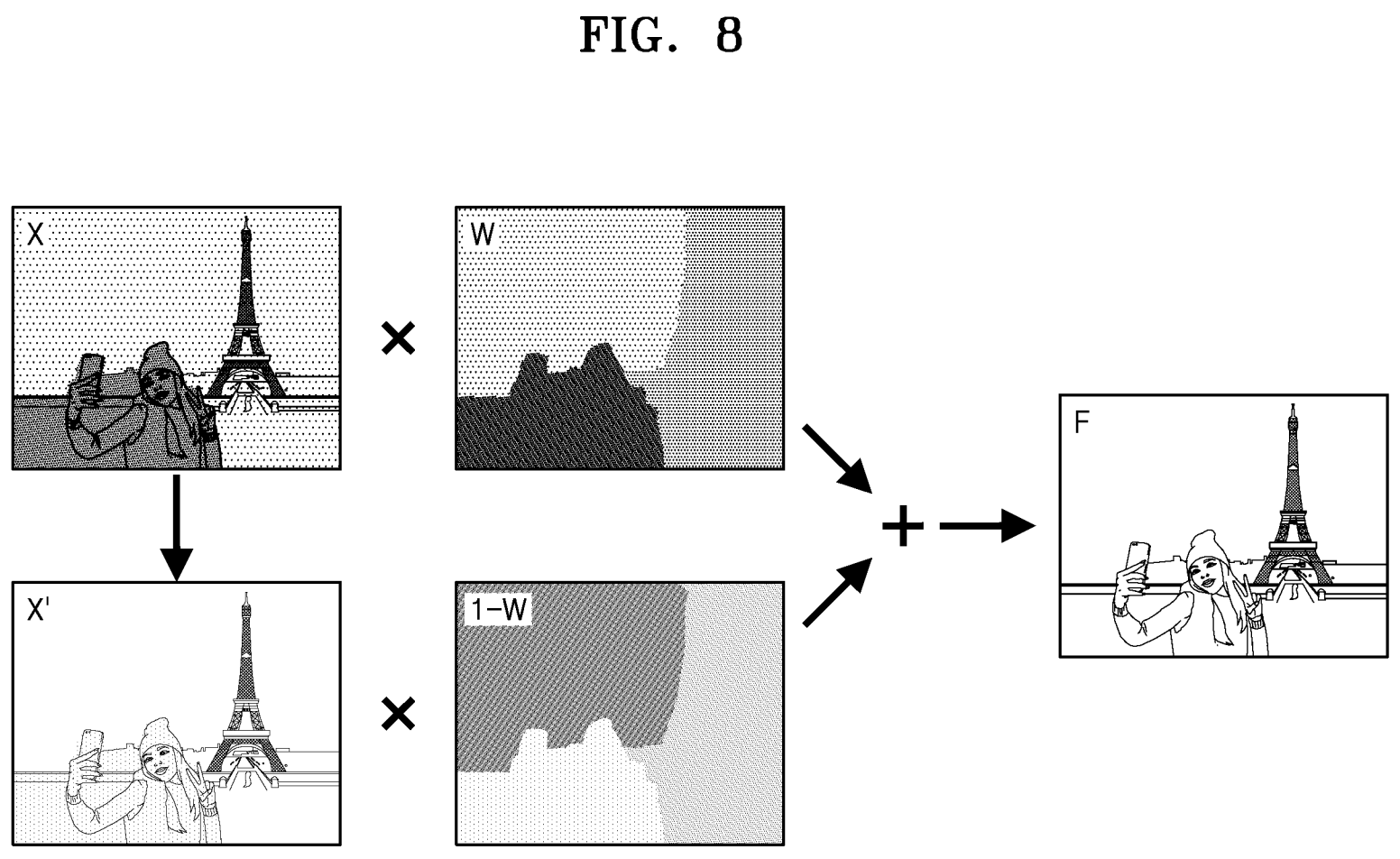

FIG. 8 is a view for describing the α value 13 applied to the exposure fusion algorithm 330, according to an embodiment of the disclosure. The exposure fusion algorithm 330 may generate a processed image X' having different exposure from a basic image X, and may output a fusion image F by respectively multiplying the basic image X and the processed image X' by a weight W and a weight (1-W) and adding multiplication results. The basic image X may correspond to the input image 1 of FIG. 5, and the output fusion image F may correspond to the label image 3 of FIG. 5.

The exposure fusion algorithm 330 may generate the processed image X' from the basic image X according to Equation 1.

$$X' = \alpha X^\beta \qquad \text{[Equation 1]}$$

When the exposure fusion algorithm 330 is performed by using the above method, the fusion image F may become brighter than the basic image X as the α value 13 increases, and also, the fusion image F may become brighter than the basic image X as a β value decreases. Although the α value 13 is used as a correction parameter for the exposure fusion algorithm in FIG. 5, the β value, instead of the α value, may be used as a correction parameter, or both the α value 13 and the β value may be used as a correction parameter.

The label image generation module 300 may output the label image 3 that is obtained by adjusting at least one of characteristics of the input image 1 by applying correction parameters (e.g., 11, 12, and 13) to image correction algorithms (e.g., 310, 320, and 330). The label image generation module 300 may use a combination of at least one of the image correction algorithms (e.g., 310, 320, and 330) illustrated in FIG. 5, or may use another type of image correction algorithm not illustrated in FIG. 5.

An order of parameter values (e.g., 11, 12, and 13) included in the correction parameter 10 may be maintained the same during training and inference. In other words, an order of the parameter values (e.g., 11, 12, and 13) in the correction parameter 10 used during training the neural network models 100 and 200 may be maintained the same during use of the neural network models 100 and 200.

For example, when the correction parameter 10 is a column vector, an element of each row may correspond to the same type of parameter (parameter applied to the same image correction algorithm) during training and inference.

A specific example will be described as follows.

As in an embodiment of FIG. 5, when an element of a first row of a correction parameter (column vector) 10 used during training is a parameter (e.g., 11) applied to the contrast enhancement algorithm 310, an element of a second row is a parameter (e.g., 12) applied to the brightness correction algorithm 320, and an element of a third row is a parameter (e.g., 13) applied to the exposure fusion algorithm 330, an element of a first row of a correction parameter used during inference may be the parameter (e.g., 11) applied to the contrast enhancement algorithm 310, an element of a second row may be the parameter (e.g., 12) applied to the brightness correction algorithm 320, and an element of a third row may be the parameter (e.g., 13) applied to the exposure fusion algorithm 330.

This will be described with reference to FIG. 9.

Figure 9:
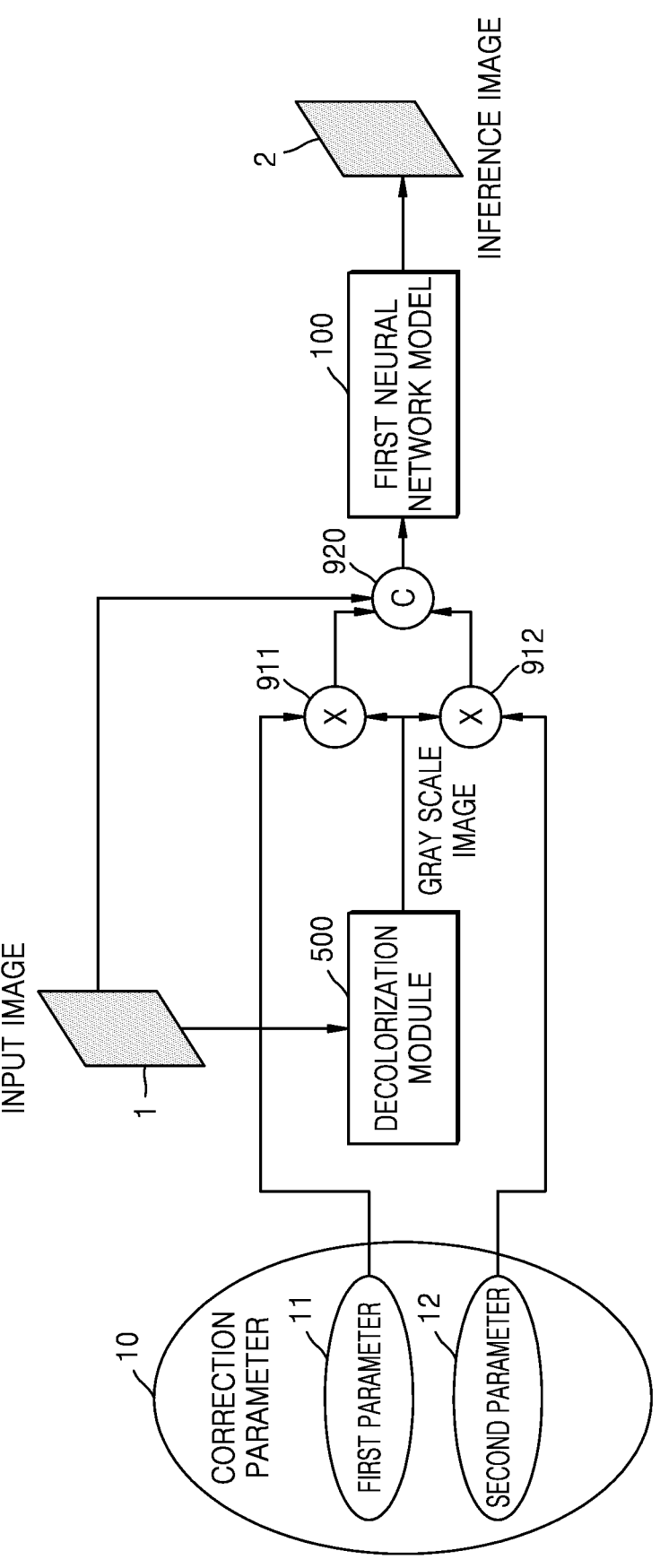
FIG. 9 is a diagram for describing a method of applying a correction parameter as an input to a first neural network model, according to an embodiment of the disclosure.

Referring to FIG. 9, two parameter values (e.g., 11 and 12) are scaled concatenated (see 1201 of FIG. 12) with the input image 1 and a gray scale image converted from the input image 1 and then are input to the first neural network model 100. That is, gray scale images multiplied (or divided, or added) by the parameter values (e.g., 11 and 12) are attached to the input image 1 in a channel direction and are input to the first neural network model 100. In this case, because a channel order should be the same as during training and inference, an order of the parameter values (e.g., 11, 12, and 13) included in the correction parameter 10 should be maintained the same during training and inference as described above.

Also, the number of bits of each of the parameter values (e.g., 11, 12, and 13) included in the correction parameter 10 may be maintained the same during training and inference. An embodiment where an order of the parameter values (e.g., 11, 12, and 13) included in the correction parameter 10 and the number of bits of each of the parameter values (e.g., 11, 12, and 13) are maintained the same during training and inference will be described in detail as follows.

It is assumed that the correction parameter 10 used during training of the first and second neural network models 100 and 200 is binary data "01010110". It is assumed that first 3-bit data "010" is the parameter (e.g., 11) to be applied to the contrast enhancement algorithm 310, next 2-bit data "10" is the parameter (e.g., 12) to be applied to the brightness correction algorithm 320, and last 3-bit data "110" is the parameter (e.g., 13) to be applied to the exposure fusion algorithm 330.

The number of bits of each of the parameters (e.g., 11, 12, and 13) and an order of the parameters (e.g., 11, 12, and 13) should be maintained the same even during use (inference) of the first and second neural network models 100 and 200. For example, binary data "10111100" is input as the correction parameter 10 to the first neural network model 100 during inference, first 3-bit data "101" is the parameter (e.g., 11) to be applied to the contrast enhancement algorithm 310, next 2-bit data "11" is the parameter (e.g., 12) to be applied to the brightness correction algorithm 320, and last 3-bit data "100" is the parameter (e.g., 13) to be applied to the exposure fusion algorithm 330.

Referring back to FIG. 3, the label image 3 output from the label image generation module 300 may be used as training data (in particular, ground truth data) for training the first neural network model 100. The first neural network model 100 may be trained so that the inference image 2 output from the first neural network model 100 when the input image 1 and the correction parameter 10 are input to the first neural network model 100 is similar to the label image 3 as much as possible. That is, the first neural network model 100 may be a model trained to minimize a difference between the inference image 2 output when the input image 1 and the correction parameter 10 are input and the label image 3 corresponding to the correction parameter 10. In this case, the label image 3 corresponding to the correction parameter 10 may be an image obtained by, when the correction parameter 10 is applied to at least one image correction algorithm, correcting the input image 1 by using the at least one image correction algorithm.

In other words, the optimizer 400 may update the first neural network model 100 to minimize a loss value of the loss function 20 indicating a difference between the inference image 2 and the label image 3. In this case, the loss function 20 may include a combination of a mean absolute error (MAE), a mean square error (MSE), and a structural similarity index measure (SSIM).

As described above, during training of the first neural network model 100, the input image 1, the label image 3, and the correction parameter 10 may be used as training data. A plurality of label images 3 may be generated by changing the correction parameter 10 for several input images 1, and the first neural network model 100 may be trained by using a combination of the input images 1, the label images 3, and the correction parameter 10 collected in this way as training data.

As such, the first neural network model 100 may be trained on a relationship between the correction parameter 10 and the label image 3 by using the correction parameter 10 as an input to the first neural network model 100 during training of the first neural network model 100. That is, the first neural network model 100 may be trained about which label image 3 is generated when which correction parameter 10 is applied to the input image 1. When only the correction parameter 10 is changed while the input image 1 input to the trained first neural network model 100 is maintained the same, the inference image 2 output from the first neural network model 100 is also changed. Accordingly, the user may control the inference image 2 output from the first neural network model 100 to have desired image characteristics by adjusting the correction parameter 10 input to the first neural network model 100. A specific embodiment of applying the correction parameter 10 as an input to the first neural network model 100 will be described with reference to FIG. 9.

FIG. 9 is a diagram for describing a method of applying a correction parameter as an input to a first neural network model, according to an embodiment of the disclosure. In an embodiment of FIG. 9, it is assumed that the correction parameter 10 includes a first parameter 11 and a second parameter 12.

Referring to FIG. 9, the input image 1 is converted into a gray scale image by a decolorization module 500. A first operation unit 911 performs multiplication on the gray scale image and the first parameter 11, and a second operation unit 912 performs multiplication on the gray scale image and the second parameter 12. A third operation unit 920 may perform concatenation on an output of the first operation unit 911 and an output of the second operation unit 912 and may output a result to the first neural network model 100. That is, each of the first and second parameters 11 and 12 included in the correction parameter 10 may be applied to the gray scale image converted from the input image 1 and then may be input together with the input image 1 to the first neural network model 100.

Although the gray scale image is multiplied by the first parameter 11 and the second parameter 12 and then concatenated with the input image 1 in FIG. 9, the gray scale image and the first and second parameters 11 and 12 may be processed by using an operation other than multiplication. For example, the gray scale image may be divided by each of the first and second parameters 11 and 12, and then concatenated with the input image, or each of the first and second parameters 11 and 12 may be added to the gray scale image and then may be concatenated with the input image 1.

Figure 4:
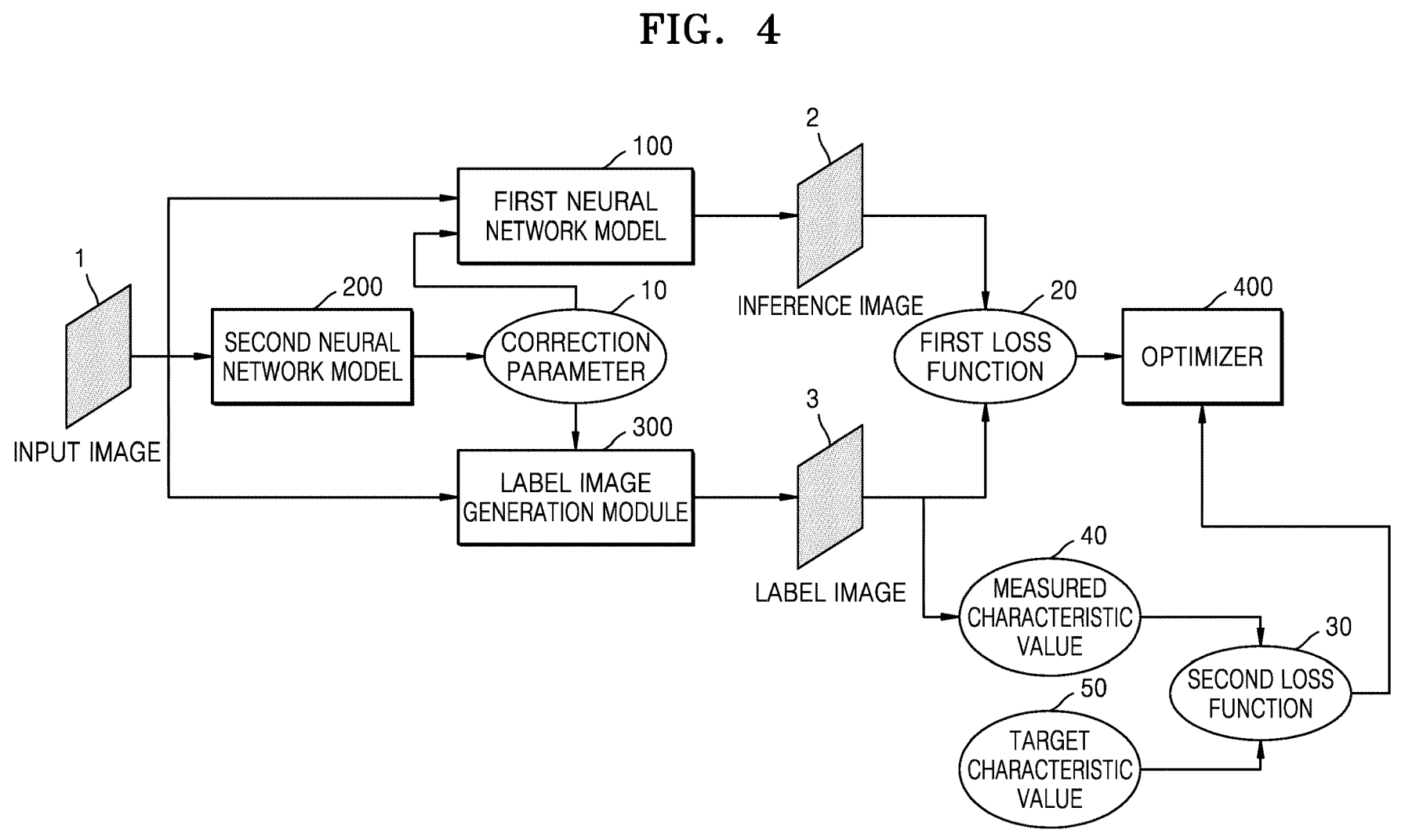

FIG. 4 is a diagram for describing a process of training the second neural network model 200, according to an embodiment of the disclosure.

First, the reason why the second neural network model 200 is used will be described.

The second neural network model 200 may infer a correction parameter for correcting the input image 1 to have image characteristics (e.g., image characteristics determined to be optimal by a designer of a neural network model) that many users may generally like.

Accordingly, using the second neural network model 200, even a user does not set or adjust a correction parameter every time, a correction parameter for correcting the input image 1 to have optimal image characteristics may be automatically generated (inferred) and thus, the input image 1 may be accordingly corrected and provided to the user.

For example, when the user captures an image through a terminal on which the first and second neural network models 100 and 200 are mounted, the captured image may be corrected according to a correction parameter inferred by the second neural network model 200 and may be displayed on a screen of the terminal as a preview.

Accordingly, the user of the terminal may first check, through the preview, the image having good image characteristics (brightness, contrast, etc.), and may adjust the correction parameter to change image characteristics only when the preview is not satisfactory.

Referring to FIG. 4, the second neural network model 200 that receives the input image 1 and infers and outputs the correction parameter 10 is added. As shown in FIG. 4, two neural network models, that is, the first and second neural network models 100 and 200, may be simultaneously trained in a state where the first neural network model 100 and the second neural network model 200 are connected, or the first neural network model 100 may be first trained and then the second neural network model 200 may be trained in a state where the trained first neural network model 100 is fixed (parameters included in the first neural network model 100 are fixed). Also, each of the first neural network model 100 and the second neural network model 200 may be separately trained.

During training of the second neural network model 200, a measured characteristic value 40 that quantifies a characteristic (e.g., a brightness, contrast, or color temperature) of the label image 3 may be compared with a preset target characteristic value 50, and the second neural network model 200 may be updated to minimize a difference between the measured characteristic value 40 and the preset target characteristic value 50. The target characteristic value 50 may be pre-set to a value desired by the user (manager). That is, the second neural network model 200 may be a model trained to minimize a difference between the correction parameter 10 inferred by the second neural network model 200 when the input image 1 is input and a correction parameter (correction parameter that allows the label image generation module 300 to output an image corresponding to the target characteristic value 50 in FIG. 4) that allows the label image 3 to have preset image characteristics.

In other words, the optimizer 400 may update the second neural network model 200 to minimize a loss value of a second loss function 30 indicating a difference between the measured characteristic value 40 and the target characteristic value 50. In this case, the second loss function 30 may include a combination of an MAE, an MSE, and an SSIM.

The measured characteristic value 40 and the target characteristic value 50 used during training of the second neural network model 200 may include a plurality of values corresponding to a plurality of image characteristics. For example, the measured characteristic value 40 and the target characteristic value 50 may include a first characteristic value that quantifies a brightness of an image and a second characteristic value that quantifies a color temperature of the image.

In an embodiment of FIG. 4, the measured characteristic value 40 for the label image 3 is obtained to train the second neural network model 200, and the obtained measured characteristic value 40 is compared with the preset target characteristic value 50. However, the measured characteristic value 40 for an image (hereinafter, referred to as an 'intermediate label image') generated in the middle of a process of converting the input image 1 into the label image 3 may be obtained, and the second neural network model 200 may be trained by comparing the obtained measured characteristic value 40 with the preset target characteristic value 50.

A specific example will be described with further reference to FIG. 5 as follows.

When a specific value is measured to train the second neural network model 200, a characteristic value for an image (intermediate label image) to which only some of a plurality of image correction algorithms (e.g., 310, 320, and 330) included in the label image generation module 300 are applied may be measured, and the second neural network model 200 may be trained by comparing the measured characteristic value with a preset target characteristic value.

In FIG. 5, it is assumed that when the input image 1 is input to the label image generation module 300, the input image 1 is converted into the label image 3 sequentially through the contrast enhancement algorithm 310, the brightness correction algorithm 320, and the exposure fusion algorithm 330.

For example, a measured characteristic value that quantifies a 'brightness' of an intermediate label image (input image to the exposure fusion algorithm 330) obtained by applying only the contrast enhancement algorithm 310 and the brightness correction algorithm 320 to the input image 1 may be obtained, and the second neural network model 200 may be trained to minimize a difference (loss) between the obtained measured characteristic value and a preset target characteristic value for 'brightness'. As such, when the second neural network model 200 is trained in this way, the parameter (13) applied to the exposure fusion algorithm 330 may be trained to minimize a separate loss regardless of a target brightness (brightness corresponding to the target characteristic value).

The second neural network model 200 may include a plurality of neural network models. For example, when the second neural network model 200 infers a first correction parameter and a second correction parameter, a neural network model for inferring each correction parameter may separately exist. When necessary, a neural network model for inferring a third correction parameter may be added to the second neural network model 200, and the second neural network model 200 may be changed to infer the first to third correction parameters.

3. (Process of Use) Method of Correcting an Image by Using the First Neural Network and the Second Neural Network A method of correcting an image by using the first neural network model 100 and the second neural network model 200 trained according to the above method will be described. First, how the first and second neural network models 100 and 200 according to an embodiment of the disclosure may be used in an actual device will be first described with reference to FIGS. 10 and 11, and then a method of correcting an image by using the first and second neural network models 100 and 200 will be described.

Figure 10:
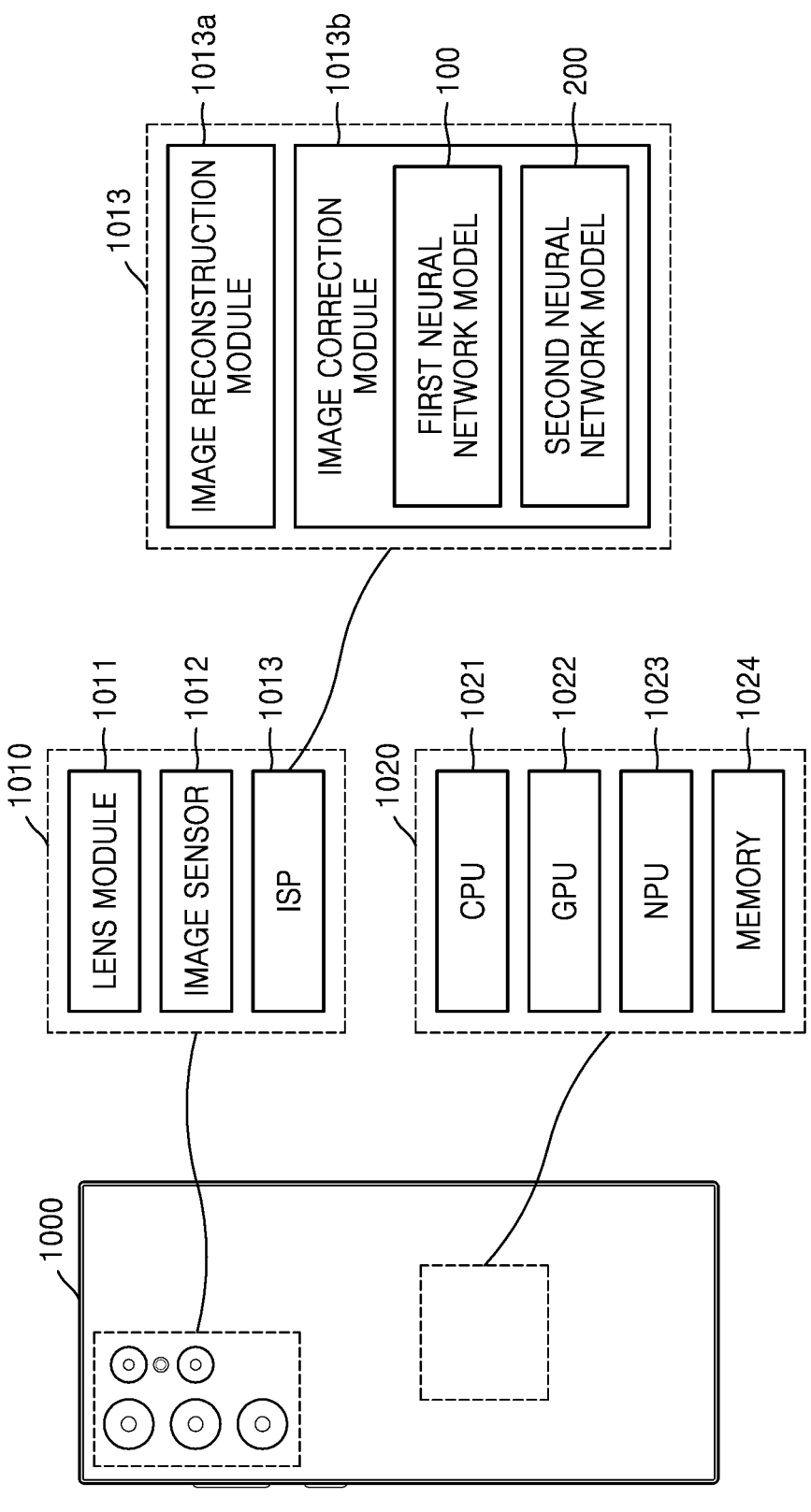
FIG. 10 is a diagram schematically illustrating elements included in a mobile terminal, according to an embodiment of the disclosure.

FIG. 10 is a diagram schematically illustrating elements included in the mobile terminal 1000, according to an embodiment of the disclosure. Although a device on which the first neural network model 100 and the second neural network model 200 are mounted is the mobile terminal 1000 in FIG. 10, the embodiments are not limited thereto, and the first and second neural network models 100 and 200 may be mounted on any type of device having an image capturing function such as a camera. Furthermore, it is obvious that the first and second neural network models 100 and 200 may also be mounted on any of various types of devices that do not have an image capturing function but may perform image signal processing.

Referring to FIG. 10, the mobile terminal 1000 may include a camera module 1010 and a main processor 1020.

The camera module 1010 may include a lens module 1011, an image sensor 1012, and an image signal processor (ISP) 1013, and the lens module 1011, the image sensor 1012, and the ISP 1013 may be mounted on one chip as a system-on-chip (SoC).

The image sensor 1012 may receive light transmitted through the lens module 1011 and may output an image, and the ISP 1013 may reconstruct and correct the image output from the image sensor 1012 and may output a final image. That is, when a user captures an image through the mobile terminal 1000, a final image reconstructed and corrected through the ISP 1013 is displayed to the user.

The ISP 1013 may include an image reconstruction module 1013a and an image correction module 1013b, and the first neural network model 100 and the second neural network model 200 may be included in the image correction module 1013b. In this case, the image reconstruction module 1013a and the image correction module 1013b may be a software unit that performs a specific function in a program for performing image processing.

The image reconstruction module 1013a may perform processing such as demosaicing and denoising on a raw image output from the image sensor 1012 to output a linear RGB image, and the image correction module 1013b may correct the linear RGB image to output a final image. A specific embodiment of the image reconstruction module 1013a and the image correction module 1013b will be described with reference to FIG. 11.

Figure 11:
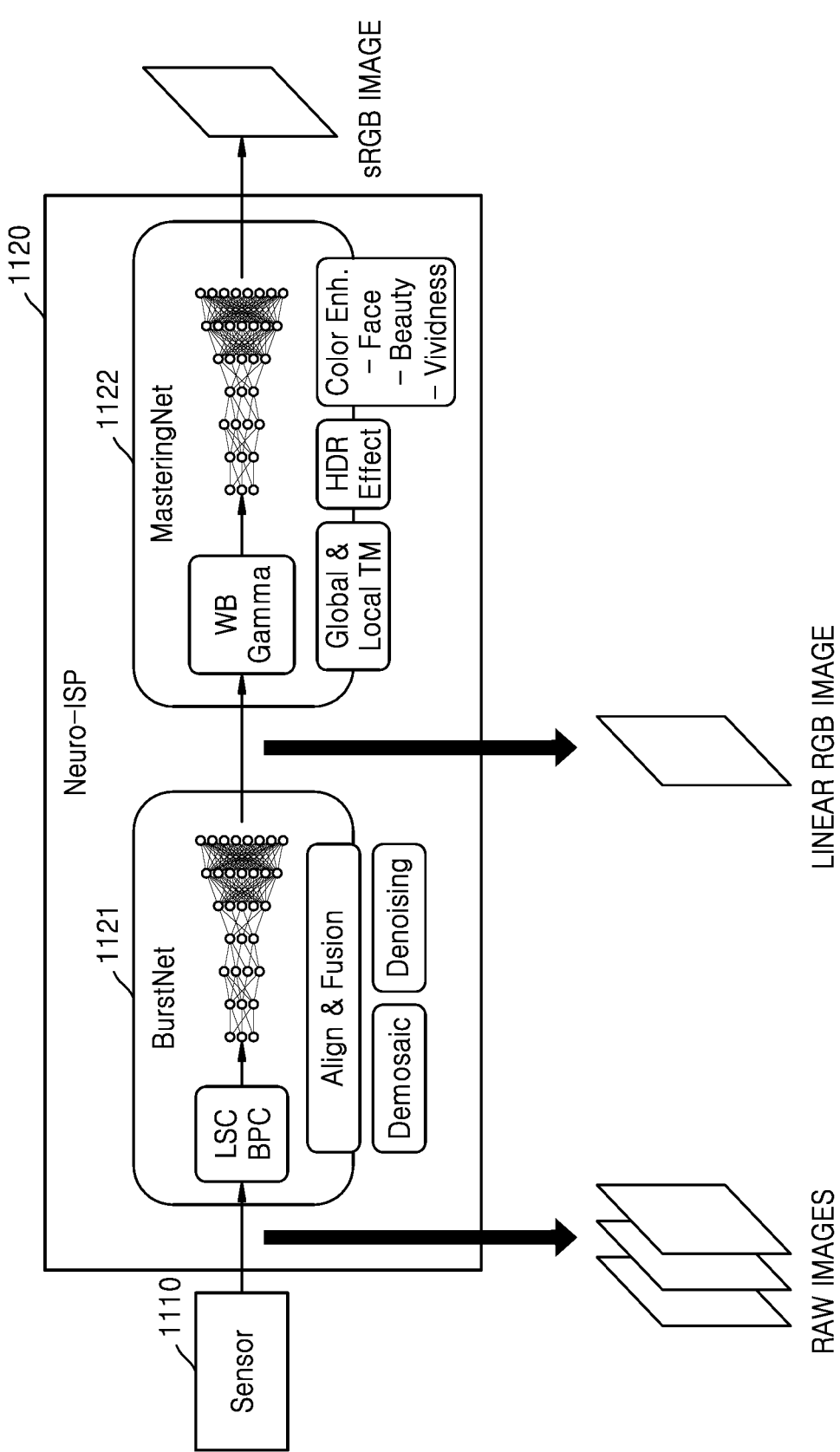
FIG. 11 is a diagram schematically illustrating a detailed configuration of an image signal processor (ISP), according to an embodiment of the disclosure.

FIG. 11 is a diagram schematically illustrating a detailed configuration of an ISP, according to an embodiment of the disclosure. A sensor 1110 of FIG. 11 may correspond to the image sensor 1012 of FIG. 10, and a neuro-ISP 1120 of FIG. 11 corresponds to a specific embodiment of the ISP 1013 of FIG. 10. The neuro-ISP 1120 is an element that processes an image signal by using a neural network. The neuro-ISP 1120 may be a single neural network end-to-end based ISP, rather than a method of applying AI to a portion of an ISP in units of modules.

Referring to FIG. 11, the sensor 1110 may output a plurality of raw images. In this case, a 'raw image' is an image output from an image sensor of a camera, and may refer to a Bayer format image having only one color channel per pixel.

A BurstNet 1121 of FIG. 11 may correspond to the image reconstruction module 1013*a* of FIG. 10, and a Mastering-Net 1122 of FIG. 11 may correspond to the image correction module 1013*b* of FIG. 10.

The BurstNet 1121 may receive the plurality of raw images and may output one linear RGB image. The plurality of raw images input to the BurstNet 1121 are images captured before and after a specific point of time, and the BurstNet 1121 may output one linear RGB image by using temporal information of the raw images and performing demosaicing and denoising. The output linear RGB image may correspond to the input image 1 input to a neural network model in embodiments of the disclosure.

The MasteringNet 1122 may perform correction on the linear RGB image. For example, the MasteringNet 1122 may adjust image characteristics by adjusting white balance (WB) on the linear RGB image, adjusting a gamma value, or performing processing such as global tone mapping and local tone mapping, and may output an sRGB image as a final image.

Neural network models according to embodiments of the disclosure may be included in the MasteringNet 1122 and may correct the linear RGB image (input image).

Although it is assumed that the input image 1 is the linear RGB image and the inference image 2 is the sRGB image in the above, the input image 1 and the inference image 2 may be images in various formats. For example, each of the input image 1 and the inference image 2 may be any one of a non-linear RGB image, an sRGB image, an AdobeRGB image, a bCr image, and a Bayer image.

A format of each of the input image 1 and the inference image 2 may be determined according to a purpose or environment in which a neural network model is used. However, a format of the input image 1 used during training may be maintained the same even during inference, and in a similar principle, a format of the inference image 2 used during training may be maintained the same even during inference.

For example, when the input image 1 of a specific format is used during training of the first neural network model 100, the first neural network model 100 may receive the input image 1 of the same format (as the input image 1 used during training) and may process the input image to output the inference image 2.

In an embodiment of FIG. 10, the first neural network model 100 and the second neural network model 200 are mounted on the camera module 1010. Unlike this, the first and second neural network models 100 and 200 may be mounted on the main processor 1020 of the mobile terminal 1000. The main processor 1020 may include a CPU 1011, a GPU 1012, an NPU 1013, and a memory 1014, and at least one of the CPU 1011, the GPU 1012, or the NPU 1013 may execute a program stored in the memory 1014 to implement the first and second neural network models 100 and 200.

Figure 19:
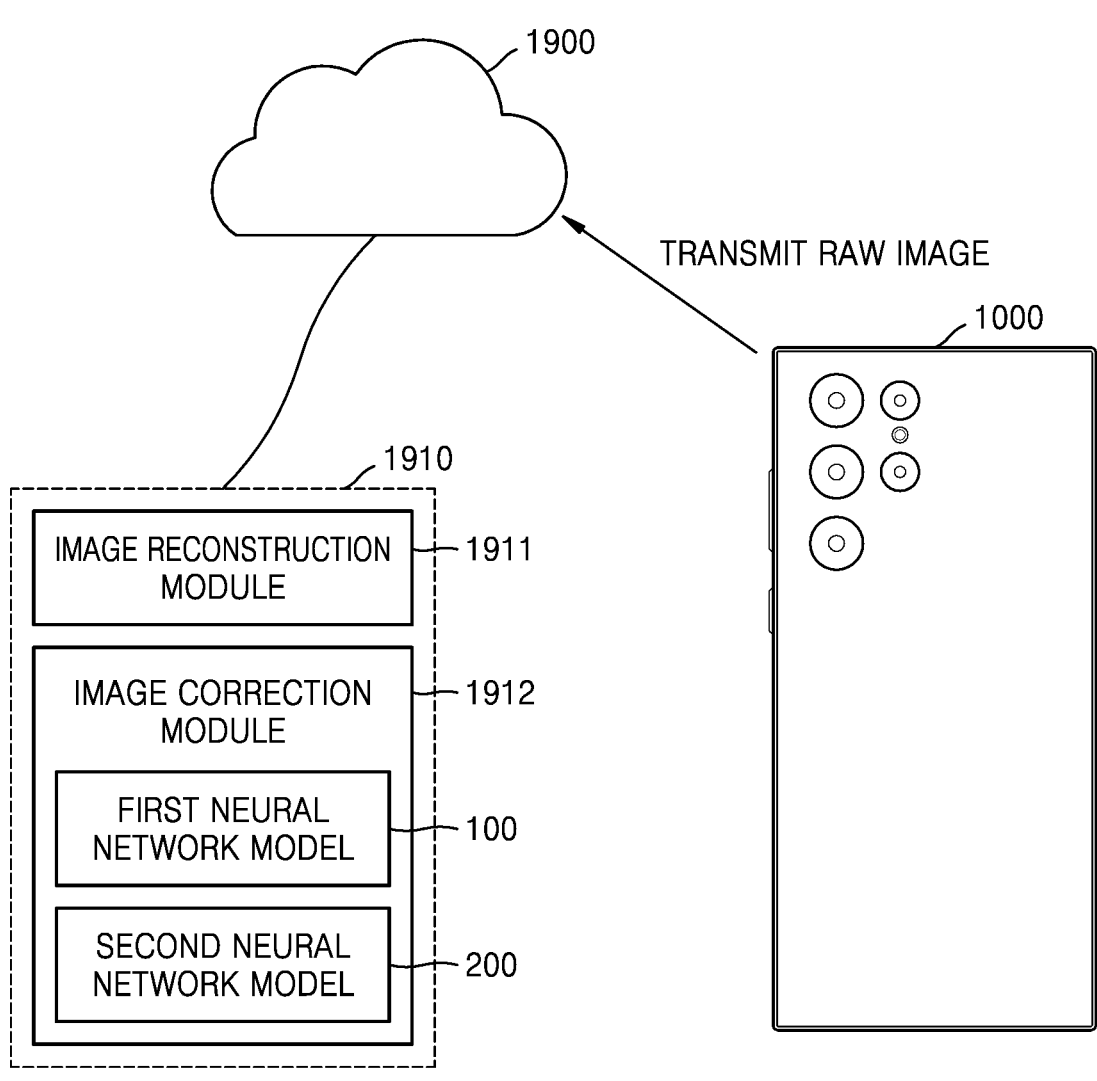
FIG. 19 is a diagram for describing an embodiment where a cloud server corrects an image received from the mobile terminal by using the first and second neural network models, according to an embodiment of the disclosure.

The first and second neural network models 100 and 200 may not be mounted on a device that captures an image, but may be implemented by an external device such as a cloud server. For example, as shown in FIG. 19, when the mobile terminal 1000 transmits raw images obtained through the image sensor 1012 to a cloud server 1900, a processor 1910 of the cloud server 1900 may generate a linear RGB image from the raw images by using an image reconstruction module 1911, may correct the linear RGB image by using the first neural network model 100 and the second neural network model 200 included in an image correction module 1912, and then may store the corrected image in the cloud server 1900 or may transmit the corrected image to the mobile terminal 1000.

The mobile terminal 1000 may reconstruct a linear RGB image from raw images, and then may transmit the reconstructed linear RGB image to the cloud server 1900, and the processor 1910 of the cloud server 1900 may correct the image by using the first and second neural network models 100 and 200 and then may store the corrected image in the cloud server 1900 or may transmit the corrected image to the mobile terminal 1000.

Figure 12:
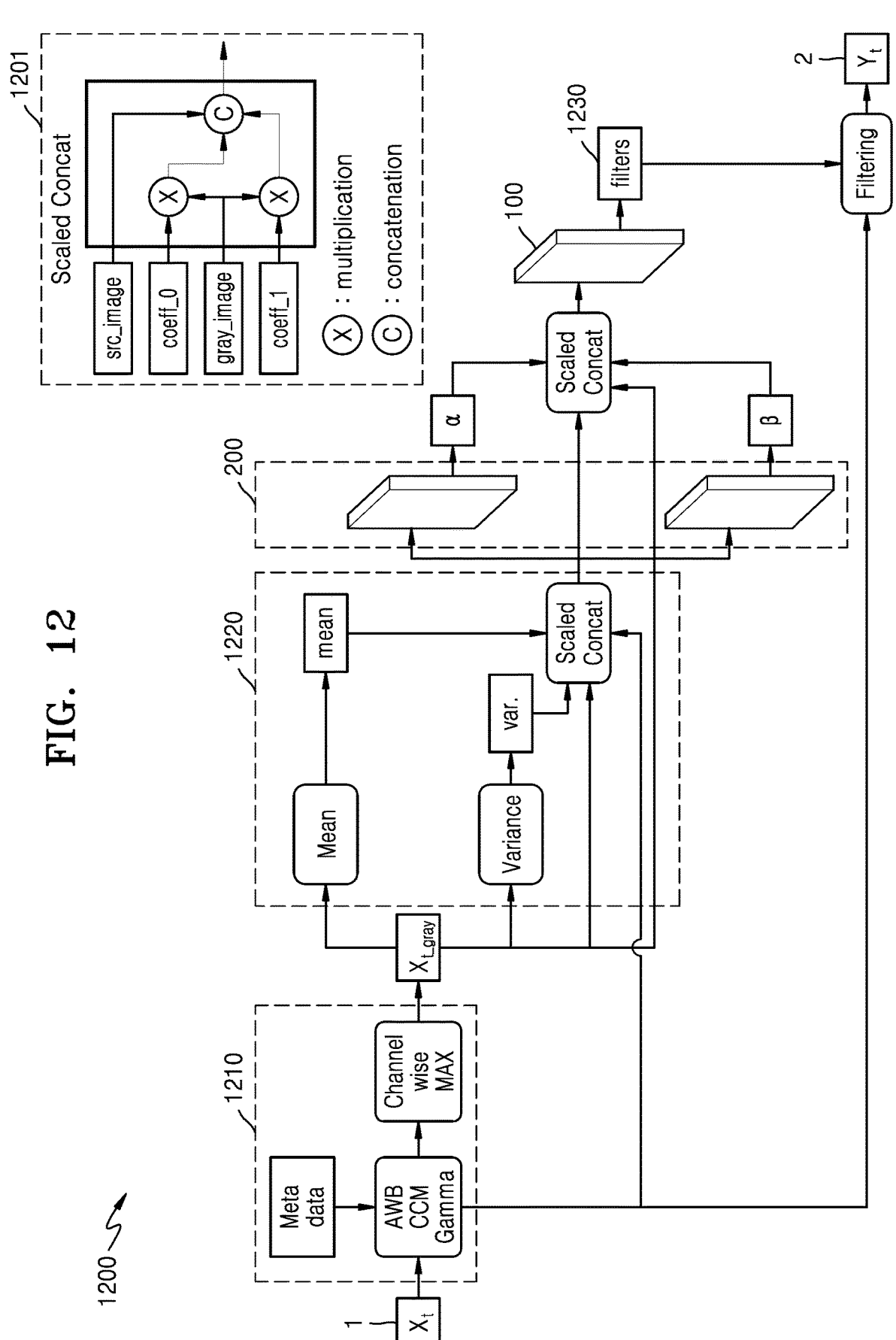
FIG. 12 is a diagram illustrating a specific embodiment where the first and second neural network models are included in an image correction module of FIG. 10, according to an embodiment of the disclosure.

FIG. 12 is a diagram illustrating a specific embodiment where the first and second neural network models 100 and 200 are included in the image correction module 1013*b*.

Referring to FIG. 12, an image correction module 1200 may include a first pre-processing unit 1210, a second pre-processing unit 1220, the first neural network model 100, and the second neural network model 200.

The first pre-processing unit 1210 for converting the input image 1 into a gray scale image may apply an auto white balance (AWB) gain, a color correction matrix (CCM), gamma, etc. included in metadata to the input image 1, and then may perform channel wise MAX for extracting a maximum value of RGB for each pixel, to convert the input image 1 into a gray scale image and output the gray scale image.

The second pre-processing unit 1220 extracts a mean and variance of pixel values from the gray scale image output from the first pre-processing unit 1210, and scaled concatenate and outputs the extracted mean and variance together with the input image 1 and the gray scale image. A specific operation structure for performing scaled concatenation is shown in portion 1201.

The second neural network model 200 may receive an output of the second pre-processing unit 1220 and may infer a correction parameter ($\alpha$, $\beta$). The correction parameter ($\alpha$, $\beta$) inferred by the second neural network model 200 may be scaled concatenated together with the input image 1 and the gray scale image and may be input to the first neural network model 100.

The first neural network model 100 may output a filter 1230 corresponding to the correction parameter ($\alpha$, $\beta$) and the input image, and the input image 1 may be converted into the inference image 2 by using the output filter 1230.

The correction parameter ($\alpha$, $\beta$) inferred by the second neural network model 200 may be adjusted by a user. When the user adjusts the correction parameter ($\alpha$, $\beta$), the first neural network model 100 may output the filter 1230 corresponding to the adjusted correction parameter ($\alpha$, $\beta$), and the input image 1 may be converted into the inference image 2 by using the output filter 1230.

As described above, the user may check, through a preview, an image corrected according to the correction parameter ($\alpha$, $\beta$) inferred by the second neural network model 200, and may adjust the correction parameter ($\alpha$, $\beta$) to have desired image characteristics.

A method of correcting an image by using a neural network model will be described with reference to FIGS. 13 to 15. For convenience of explanation, it is assumed that the ISP 1013 of the mobile terminal 1000 of FIG. 10 performs operations of FIGS. 13 to 15. However, the embodiments are not limited thereto, and all or some of operations of FIGS. 13 to 15 may be performed by the main processor 1020 of the mobile terminal 1000 or the processor 1910 of the cloud server 1900 of FIG. 19.

Figure 13:
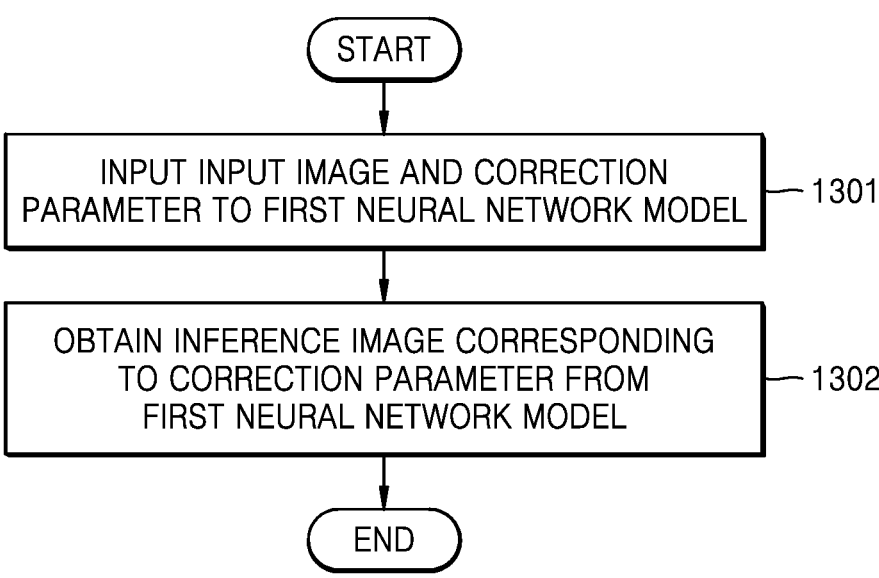
FIGS. 13 to 15 are flowcharts for describing a method of correcting an image by using a neural network model, according to an embodiment of the disclosure.

Referring to FIG. 13, in operation 1301, the ISP 1013 may input an input image and a correction parameter to the first neural network model 100. The first neural network model 100 may be a model trained to minimize a difference between an inference image output when the input image and the correction parameter are input and a label image corresponding to the correction parameter. In this case, the label image corresponding to the correction parameter may be an image obtained by, when the correction parameter is applied to at least one image correction algorithm, correcting the input image by using the at least one image correction algorithm.

The input image may be an image obtained when the image reconstruction module 1013a reconstructs and outputs raw images output from the image sensor 1012. The correction parameter may be a preset value (value used during training of the first neural network model 100), or may be α value adjusted according to a user's input. An embodiment of adjusting the correction parameter according to the user's input will be described in detail with reference to FIGS. 15 to 17.

In operation 1302, the ISP 1013 may obtain an inference image corresponding to the correction parameter from the first neural network model 100. The ISP 1013 may display the obtained inference image on a screen of the mobile terminal 1000 or may store the obtained inference image in the memory 1014.

Figure 14:
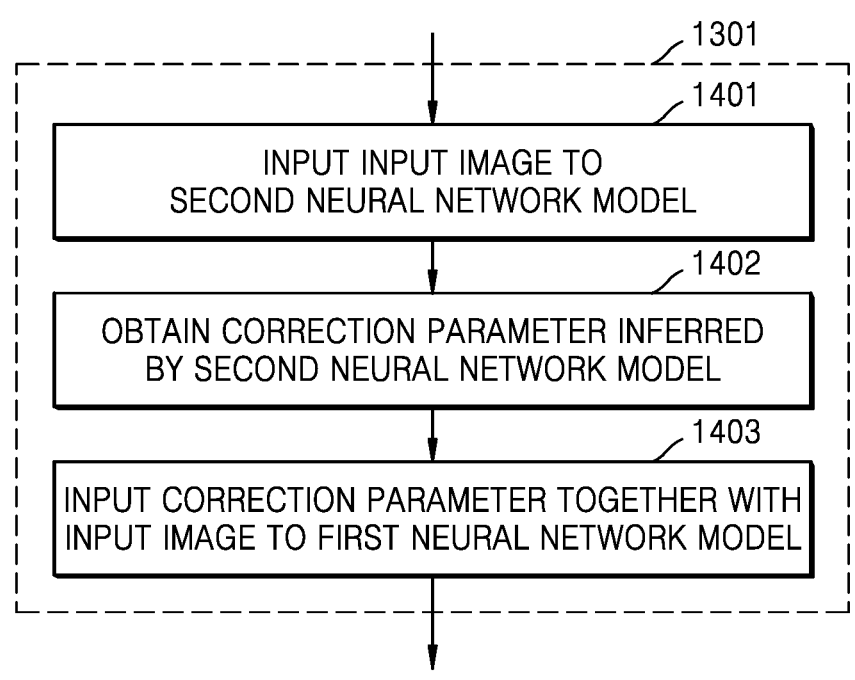

FIG. 14 is a diagram for describing an embodiment where a second neural network model infers a correction parameter. A flowchart of FIG. 14 includes detailed operations included in operation 1301 of FIG. 13.

Referring to FIG. 14, in operation 1401, the ISP 1013 may input an input image to the second neural network model 200. The second neural network model 200 may be a model trained to minimize a difference between a correction parameter inferred by the second neural network model 200 when the input image is input and a correction parameter that allows a label image to have preset image characteristics.

In operation 1402, the ISP 1013 may obtain the correction parameter inferred by the second neural network model 200, and in operation 1403, the ISP 1013 may input the correction parameter together with the input image to the first neural network model 100.

Figure 15:
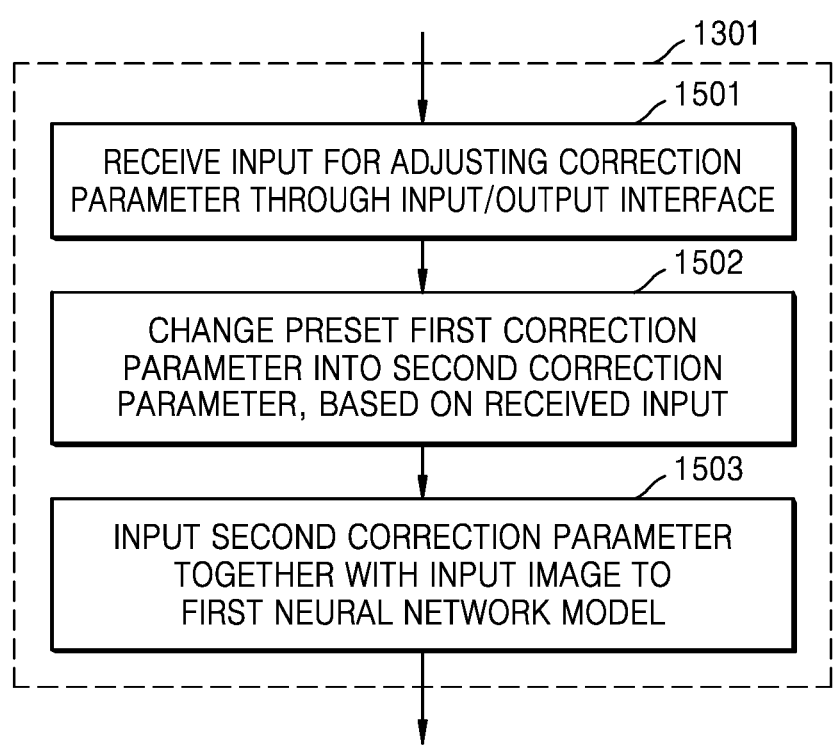

FIG. 15 is a diagram for describing an embodiment where a user adjusts a correction parameter. A flowchart of FIG. 15 includes detailed operations included in operation 1301 of FIG. 13.

Referring to FIG. 15, in operation 1501, the ISP 1013 may receive an input for adjusting a correction parameter through an input/output interface (e.g., a touchscreen or a microphone) of the mobile terminal 1000. In operation 1502, the ISP 1013 may change a preset first correction parameter into a second correction parameter, based on the input received in operation 1501. In operation 1503, the ISP 1013 may input the second correction parameter together with the input image to the first neural network model 100.

Figure 17:
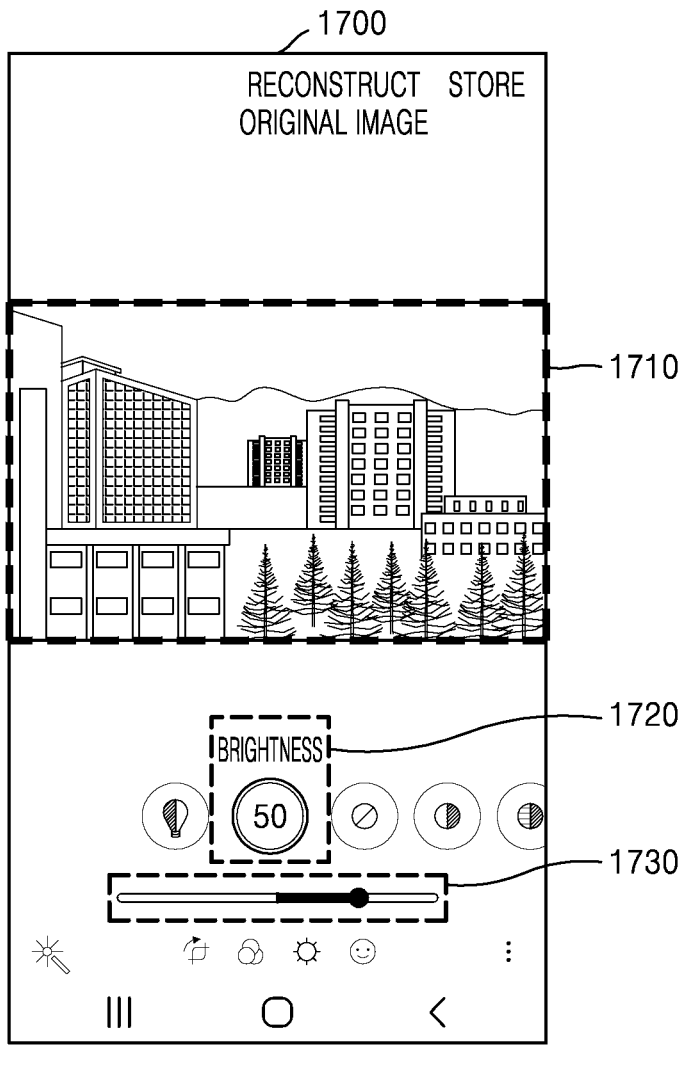
FIG. 17 is a diagram for describing an embodiment where a user adjusts a correction parameter for brightness adjustment through a user interface (UI) displayed on a screen of the mobile terminal, according to an embodiment of the disclosure.

An embodiment where a user adjusts a correction parameter for brightness adjustment through a UI displayed on a screen of the mobile terminal 1000 is illustrated in FIG. 17.

Referring to FIG. 17, an image to be corrected (inference image corresponding to a preset first correction parameter) may be displayed in a first area 1710 of a UI screen 1700 for adjusting image characteristics, and a tool for adjusting image characteristics may be displayed in a lower portion of the UI screen 1700.

It is assumed that a user selects a tool for adjusting a brightness of an image on the UI screen 1700 illustrated in FIG. 17. Information indicating a currently adjusted image characteristic is 'brightness' and a numerical value of a current brightness may be displayed in a second area 1720 of the UI screen 1700. A slider for adjusting a brightness may be displayed in a third area 1730 of the UI screen 1700, and the user may adjust a brightness of an input image by moving the slider through a touch input.

When the user moves the slider of the third area 1730 of the UI screen 1700 of FIG. 17 to increase a brightness of an input image, a numerical value displayed in the second area 1720 may increase, and the ISP 1013 may adjust the first correction parameter to a second correction parameter to increase the brightness of the image.

When the user captures an image by using the mobile terminal 1000 and selects a tool for adjusting a brightness of the image, an image obtained by correcting an input image (e.g., a linear RGB image generated from a raw image that is the captured image) according to a correction parameter inferred by the second neural network model 200 may be first displayed in the first area 1710 of the UI screen 1700. When the user adjusts a brightness through a tool displayed in the second area 1720 and the third area 1730 of the UI screen 1700, the correction parameter may be accordingly adjusted (e.g., doubled as shown in FIG. 16), and an image obtained by correcting the input image according to the adjusted correction parameter may be displayed in the first area 1710.

As described above, because the first neural network model 100 is trained on a relationship between a correction parameter and a label image, when the correction parameter is changed, a label image corresponding the changed correction parameter may be inferred. FIG. 16 is a diagram for describing a change in an inference image when a correction parameter input to a first neural network model is changed.

Figure 16:
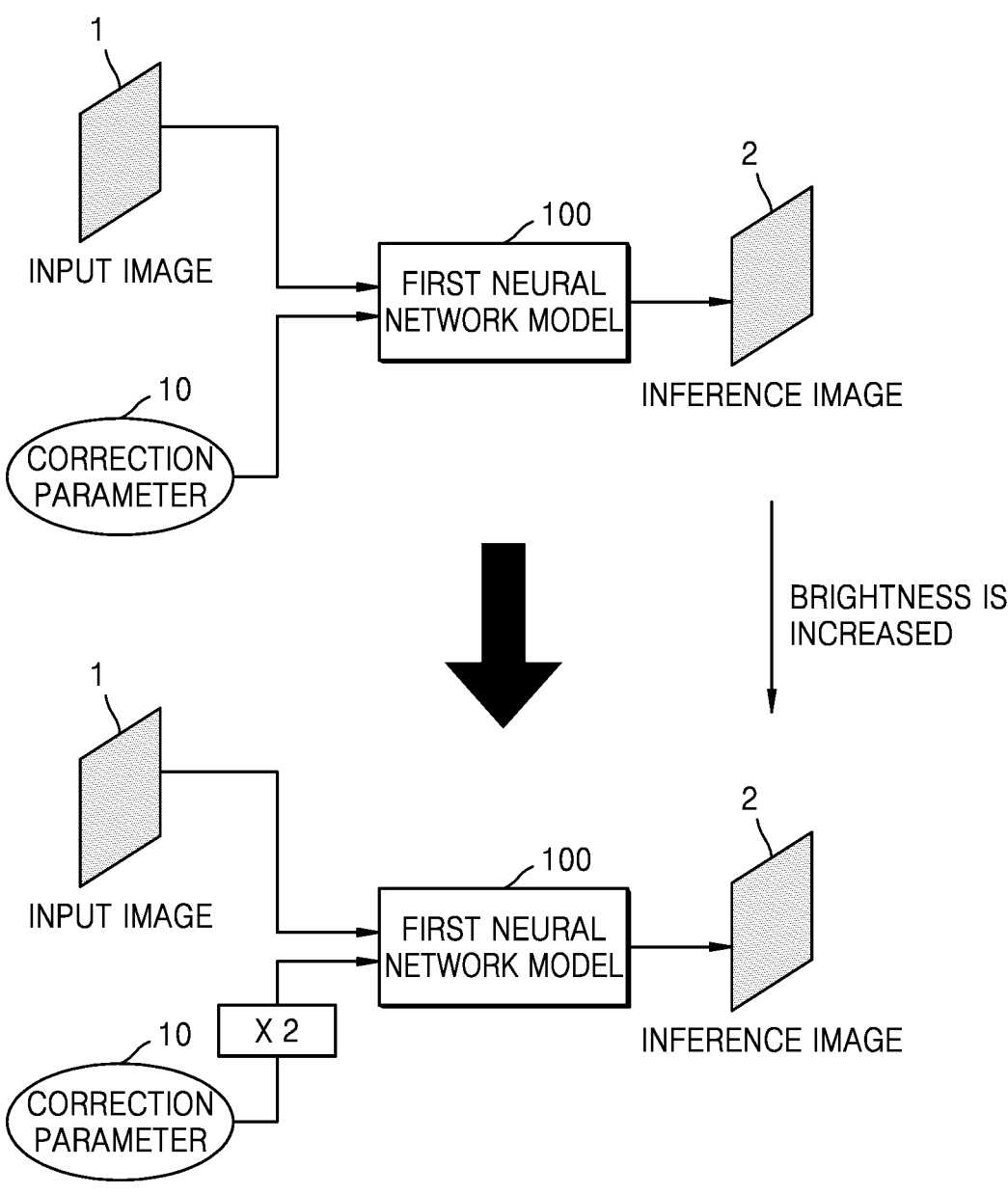
FIG. 16 is a diagram for describing a change in an inference image when a correction parameter input to a first neural network model is changed, according to an embodiment of the disclosure.

For convenience of explanation, it is assumed in FIG. 16 that the correction parameter 10 includes only a parameter related to brightness adjustment. Also, it is assumed that the first neural network model 100 is trained by using a label image generated by an image correction algorithm for adjusting a brightness, and the image correction algorithm used during training corrects an image so that a brightness increases as α value of a correction parameter increases.

In an embodiment of FIG. 16, the correction parameter 10 is doubled. A brightness of a label image corresponding to the doubled correction parameter 10 is higher than a brightness of a label image corresponding to the existing correction parameter 10. Accordingly, a brightness of the inference image 2 output from the first neural network model 100 also increases as the correction parameter 10 increases.

Although the user applies an input for adjusting a correction parameter by touching the UI screen 1700 in FIG. 17, the user may adjust the correction parameter through a voice input. For example, the user may input a voice (e.g., "Hi Bixby, make the picture brighter") indicating to adjust image characteristics through a speaker provided in the mobile terminal 1000.

A method of training the first neural network model 100 and the second neural network model 200 will be described with reference to FIGS. 20 and 21. For convenience of explanation, it is assumed that the processor 1830 of the computing device 1800 of FIG. 18 performs operations of FIGS. 20 and 21. However, the embodiments are not limited thereto, and all or some of operations of FIGS. 20 and 21 may be performed by the main processor 1020 of the mobile terminal 1000 of FIG. 10.

Figure 20:
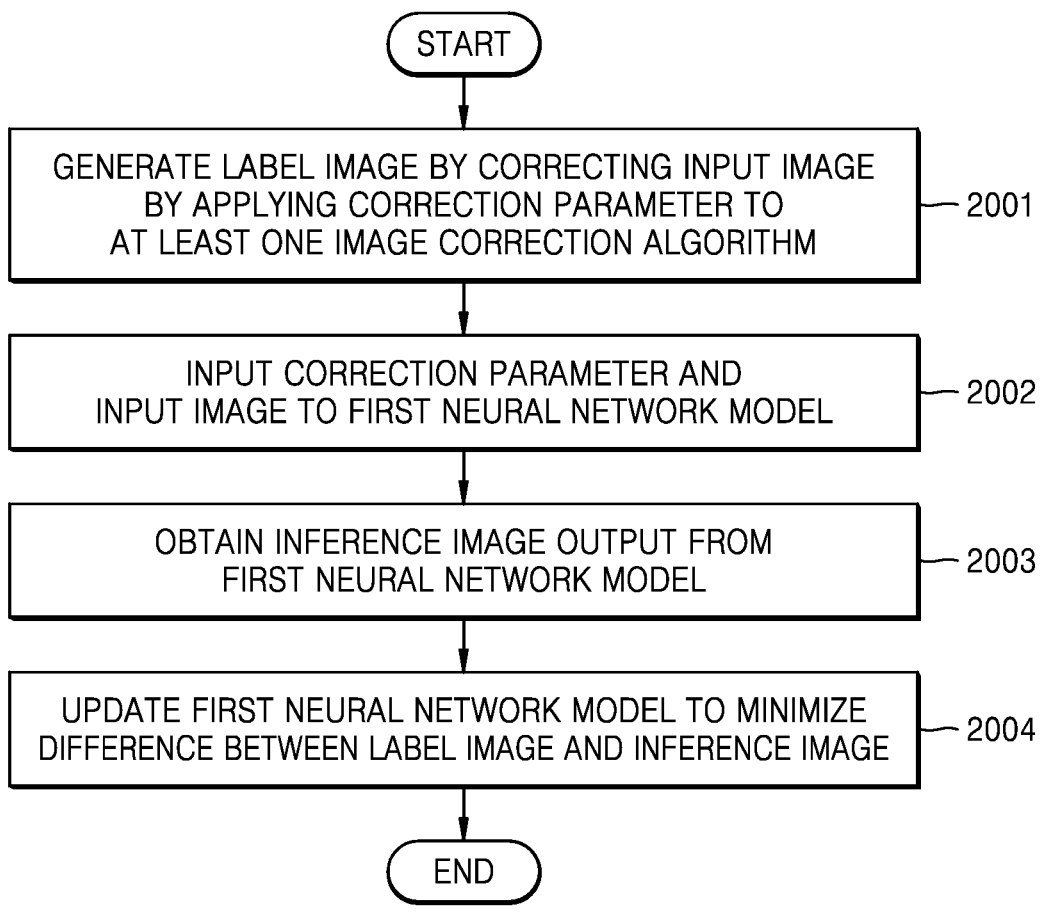

Referring to FIG. 20, in operation 2001, the processor 1830 may generate a label image by correcting an input image by applying a correction parameter to at least one image correction algorithm.

In operation 2002, the processor 1830 may input the correction parameter and the input image to a first neural network model, and in operation 2003, the processor 1830 may obtain an inference image output from the first neural network model.

In operation 2004, the processor 1830 may update the first neural network model to minimize a difference between the label image and the inference image.

Referring to FIG. 21, in operation 2101, the processor 1830 may input an input image to a second neural network model, and in operation 2102, the processor 1830 may obtain a correction parameter output from the second neural network model.

In operation 2103, the processor 1830 may generate a label image by correcting the input image by applying the correction parameter to at least one image correction algorithm.

In operation 2104, the processor 1830 may obtain a measured characteristic value that quantifies image characteristics of the label image, and in operation 2105, the processor 1830 may update the second neural network model to minimize a difference between the measured characteristic value and a preset target characteristic value.

When the first and second neural network models 100 and 200 according to the above embodiment of the disclosure are mounted on the mobile terminal 1000, the image correction module 1013*b* may be easily updated. A method of updating a neural network model will be described with reference to FIGS. 22 and 23.

Figure 22:
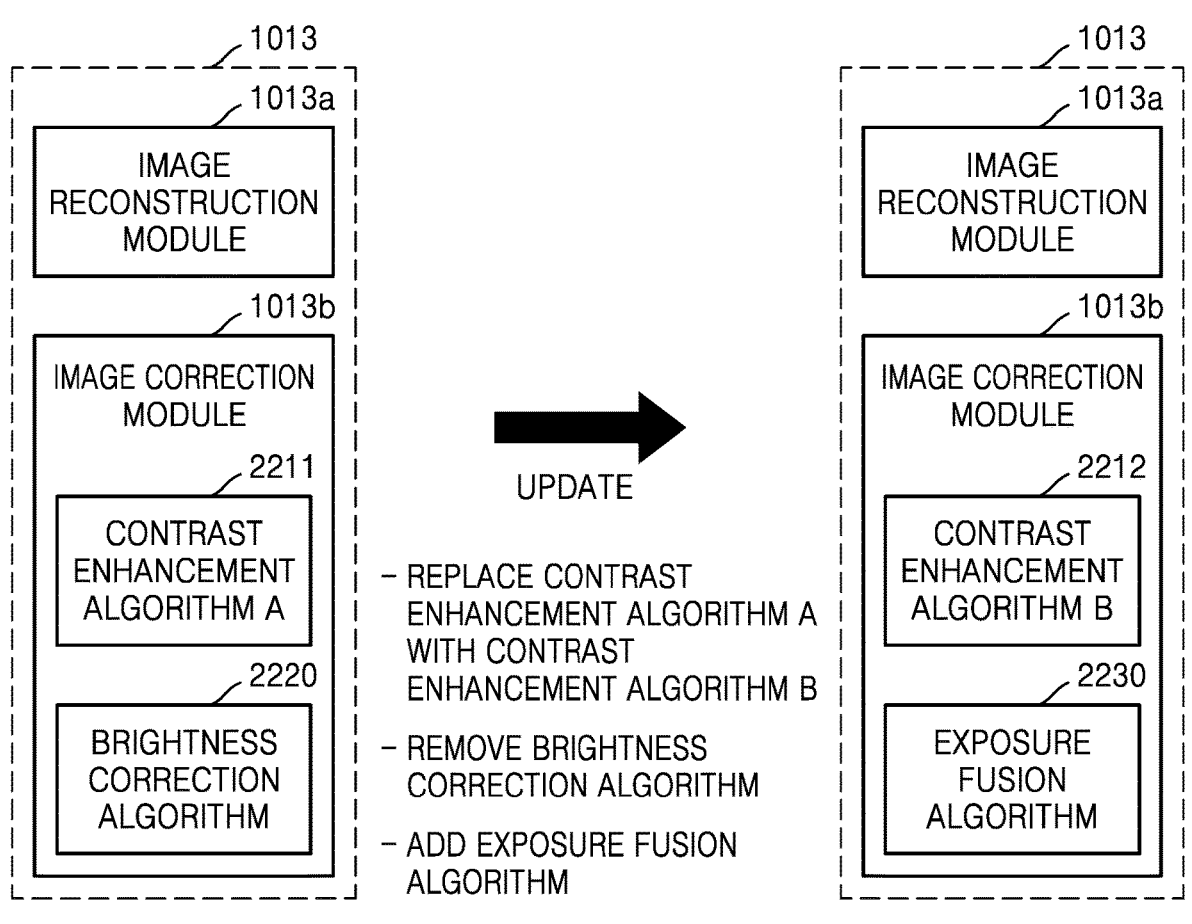
FIGS. 22 and 23 are diagrams for describing a method of updating a neural network model, according to an embodiment of the disclosure.

FIG. 22 illustrates an example where the image correction module 1013*b* included in the ISP 1013 of the mobile terminal 1000 of FIG. 10 includes image correction algorithms, instead of a neural network model. Referring to FIG. 22, the image correction module 1013*b* may include a contrast enhancement algorithm A 2211 and a brightness correction algorithm 2220.

In FIG. 22, it is assumed that the image correction algorithms included in the image correction module 1013*b* are updated. The updating is performed as follows.

1) Replace the contrast enhancement algorithm A with a contrast enhancement algorithm B
2) Remove the brightness correction algorithm
3) Add an exposure fusion algorithm A result of the updating is shown on the right side of FIG. 22. Referring to FIG. 22, in the image correction module 1013*b*, the contrast enhancement algorithm A 2211 was replaced with a contrast enhancement algorithm B 2212, the brightness correction algorithm 2220 was removed, and an exposure fusion algorithm 2230 was added.

As such, when the image correction module 1013*b* is updated in a state where the image correction module 1013*b* includes image correction algorithms, the following problems are caused.

First, because an optimization process for increasing a processing speed should be performed whenever an image correction algorithm is changed (replaced, removed, or added), a lot of time and resources are required.

Second, because a certain image correction algorithm is implemented as separate hardware, in order to add the image correction algorithm, hardware should be replaced or added. In particular, when the image correction module 1013*b* is implemented on the mobile terminal 1000, replacement or addition of hardware is subject to many restrictions.

Figure 23:
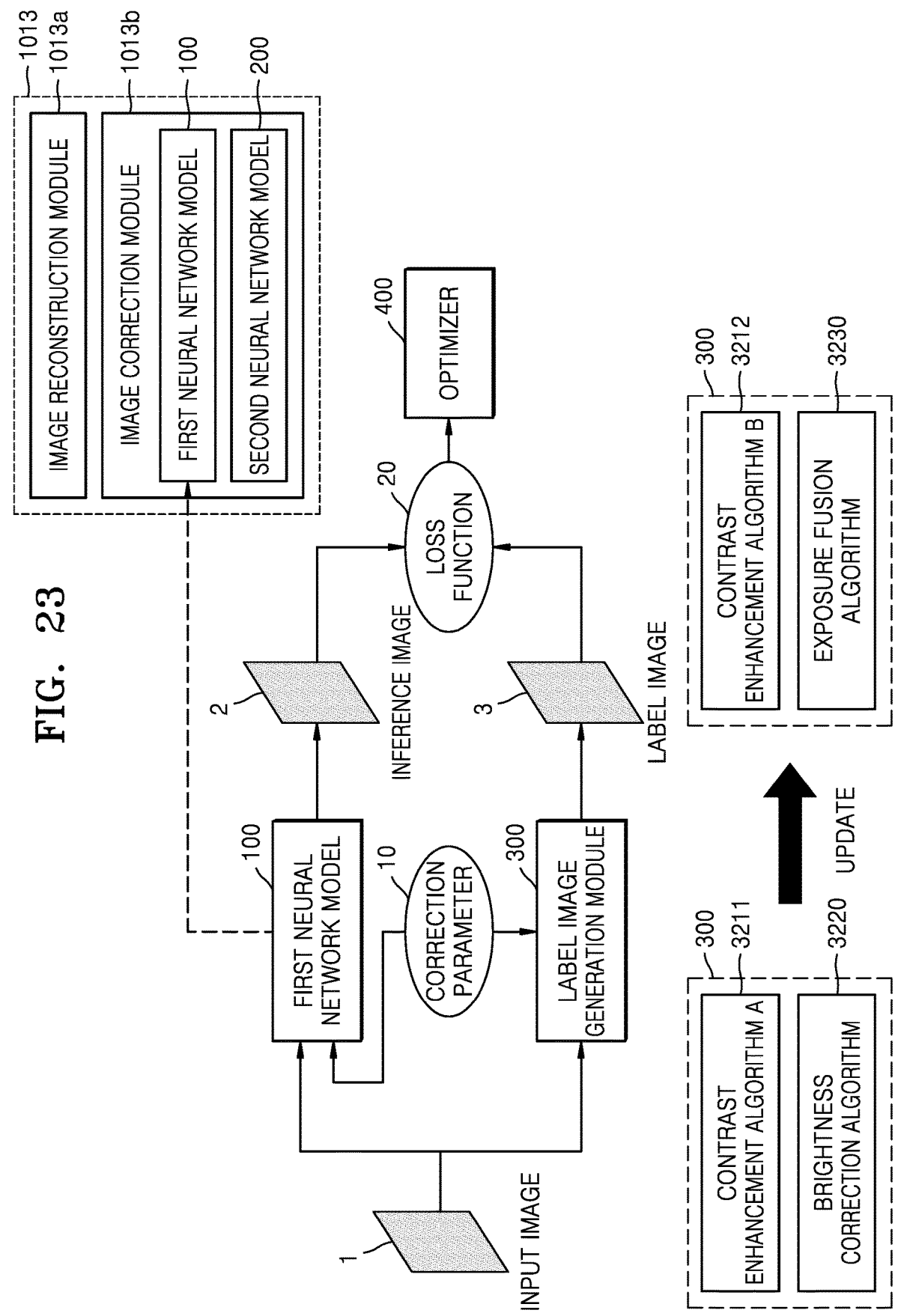

FIG. 23 illustrates an example where the image correction module 1013*b* is updated when the image correction module 1013*b* included in the ISP 1013 of the mobile terminal 1000 of FIG. 10 includes the first and second neural network models 100 and 200 according to an embodiment of the disclosure.

Referring to FIG. 23, in order to update the first neural network model 100 included in the image correction module 1013*b*, the first neural network model 100 should be trained again. As described above, because the first neural network model 100 may be trained by the separate computing device 1800 illustrated in FIG. 18, hereinafter, it is assumed that the computing device 1800 trains the first neural network model 100.

As described above, the label image generation module 300 may include image correction algorithms corresponding to image correction characteristics on which the first neural network model 100 is to be trained. Referring to FIG. 23, the processor 1830 initially configured the label image generation module 300 to include a contrast enhancement algorithm A 3211 and a brightness correction algorithm 3220, trained the first neural network 100, and then mounted the first neural network model 100 on the image correction module 1013*b* of the mobile terminal 1000.

Next, when image correction characteristics of the image correction module 1013*b* of the mobile terminal 1000 need to be adjusted, the processor 1830 may newly configure the label image generation module 300 to include a contrast enhancement algorithm B 3212 and an exposure fusion algorithm 3230, and may train the first neural network model 100 again. When the training of the first neural network model 100 is completed, the processor 1830 may transmit the newly trained first neural network model 100 to the mobile terminal 1000, and the mobile terminal 1000 may update the image correction module 1013*b* by installing the received first neural network model 100.

As such, when the image correction module 1013*b* includes the first and second neural network models 100 and 200 according to an embodiment of the disclosure, an optimization process does not need to be performed even when the image correction module 1013*b* is updated. Also, in general, because the computing device 1800 that trains the first and second neural network models 100 and 200 includes sufficient hardware resources, image correction algorithms included in the label image generation module 300 may be freely changed (replaced, removed, and added) for new training.

A method of correcting an image by using a neural network model according to an embodiment of the disclosure includes inputting, by a processor of a computing device, an input image and a correction parameter to a first neural network model, and obtaining, by the processor, an inference image corresponding to the correction parameter from the first neural network model, wherein the first neural network model is a model trained to minimize a difference between the inference image output when the input image and the correction parameter are input and a label image corresponding to the correction parameter, wherein the label image corresponding to the correction parameter is an image obtained by, when the correction parameter is applied to at least one image correction algorithm, correcting the input image by using the at least one image correction algorithm, wherein the first neural network model is trained on a relationship between the correction parameter and the label image so that the inference image output from the first neural network model is controllable by changing the correction parameter.

A first inference image output from the first neural network model when the input image and a first correction parameter are input to the first neural network model may be different from a second inference image output from the first neural network model when the input image and a second correction parameter are input to the first neural network model.

The inputting of the correction parameter may include inputting, by the processor, the input image to a second neural network model, obtaining, by the processor, the correction parameter inferred by the second neural network model, and inputting, by the processor, the correction parameter together with the input image to the first neural network model, wherein the second neural network model is a model trained to minimize a difference between a correction parameter inferred by the second neural network model when the input image is input to the second neural network model and a correction parameter that allows the label image to have preset image characteristics.

The inputting of the correction parameter may include receiving, by the processor, an input for adjusting the correction parameter through an input/output interface of the computing device, changing, by the processor, a preset first correction parameter into a second correction parameter based on the input, and inputting, by the processor, the second correction parameter together with the input image to the first neural network model.

The obtaining of the inference image may include obtaining, by the processor, an inference image corresponding to the second correction parameter from the first neural network model, wherein the first neural network model is a model trained to minimize a difference between a first inference image output when the input image and the first correction parameter are input and a first label image corresponding to the first correction parameter, and minimize a difference between a second inference image output when the input image and the second correction parameter are input and a second label image corresponding to the second correction parameter, wherein the first label image is an image obtained by, when the first correction parameter is applied to the at least one image correction algorithm, correcting the input image by using the at least one image correction algorithm, and the second label image is an image obtained by, when the second correction parameter is applied to the at least one image correction algorithm, correcting the input image by using the at least one image correction algorithm.

The first neural network model may be trained by generating the label image by correcting the input image by applying the correction parameter to the at least one image correction algorithm, inputting the correction parameter and the input image to the first neural network model, obtaining the inference image output from the first neural network model, and updating the first neural network model to minimize a difference between the label image and the inference image.

The second neural network model may be trained by inputting the input image to the second neural network model, obtaining the correction parameter output from the second neural network model, generating the label image by correcting the input image by applying the correction parameter to the at least one image correction algorithm, obtaining a measured characteristic value that quantifies image characteristics of the label image, and updating the second neural network model to minimize a difference between the measured characteristic value and a preset target characteristic value.

The inputting of the input image and the correction parameter to the first neural network model may include converting, by the processor, the input image into a gray scale image, generating, by the processor, a first gray scale image by applying a first parameter included in the correction parameter to the gray scale image, generating, by the processor, a second gray scale image by applying a second parameter included in the correction parameter to the gray scale image, and inputting, by the processor, the first gray scale image and the second gray scale image to the first neural network model.

The obtaining of the inference image may include obtaining, by the processor, at least one of a filter or map information from the first neural network model, and converting, by the processor, the input image into the inference image by using the at least one of the filter or the map information.

The inputting of the input image and the correction parameter to the first neural network model may include receiving, by the processor, from a camera included in the computing device, raw images obtained through an image sensor of the camera, generating, by the processor, the input image by using the raw images, and inputting, by the processor, the input image and the correction parameter to the first neural network model.

The inputting of the input image and the correction parameter to the first neural network model may include receiving, by the computing device, raw images from an external device, generating, by the processor, the input image by using the raw images, and inputting, by the processor, the input image and the correction parameter to the first neural network model.

A computing device for executing a neural network model for image correction may include an input/output interface through which an input is received from a user, a memory in which a program for correcting an input image is stored, and a processor configured to execute the program to input an input image and a correction parameter to a first neural network model, and obtain an inference image corresponding to the correction parameter from the first neural network model, wherein the first neural network model is a model trained to minimize a difference between the inference image output when the input image and the correction parameter are input and a label image corresponding to the correction parameter, wherein the label image corresponding to the correction parameter is an image obtained by, when the correction parameter is applied to at least one image correction algorithm, correcting the input image by using the at least one image correction algorithm, wherein the first neural network model is trained on a relationship between the correction parameter and the label image so that the inference image output from the first neural network model is controllable by changing the correction parameter.

When the processor inputs the correction parameter, the processor may input the input image to a second neural network model, obtain the correction parameter inferred by the second neural network model, and then input the correction parameter together with the input image to the first neural network model, wherein the second neural network model is a model trained to minimize a difference between a correction parameter inferred by the second neural network model when the input image is input and a correction parameter that allows the label image to have preset image characteristics.

When the processor inputs the correction parameter, the processor may receive an input for adjusting the correction parameter through the input/output interface, change a preset first correction parameter into a second correction parameter based on the input, and then input the second correction parameter together with the input image to the first neural network model.

When the processor obtains the inference image, the processor may obtain an inference image corresponding to the second correction parameter from the first neural network model, wherein the first neural network model is a model trained to minimize a difference between a first inference image output when the input image and the first correction parameter are input and a first label image corresponding to the first correction parameter, and minimize a difference between a second inference image output when the input image and the second correction parameter are input and a second label image corresponding to the second correction parameter, wherein the first label image is an image obtained by, when the first correction parameter is applied to the at least one image correction algorithm, correcting the input image by using the at least one image correction algorithm, and the second label image is an image obtained by, when the second correction parameter is applied to the at least one image correction algorithm, correcting the input image by using the at least one image correction algorithm.

The first neural network model may be trained by generating the label image by correcting the input image by applying the correction parameter to the at least one image correction algorithm, inputting the correction parameter and the input image to the first neural network model, obtaining the inference image output from the first neural network model, and then updating the first neural network model to minimize a difference between the label image and the inference image.

The second neural network mode may be trained by inputting the input image to the second neural network model, obtaining the correction parameter output from the second neural network model, generating the label image by correcting the input image by applying the correction parameter to the at least one image correction algorithm, obtaining a measured characteristic value that quantifies image characteristics of the label image, and then updating the second neural network model to minimize a difference between the measured characteristic value and a preset target characteristic value.

When the processor inputs the input image and the correction parameter to the first neural network model, the processor may convert the input image into a gray scale image, generates a first gray scale image by applying a first parameter included in the correction parameter to the gray scale image, generate a second gray scale image by applying a second parameter included in the correction parameter to the gray scale image, and then input the input image, the first gray scale image, and the second gray scale image to the first neural network model.

When the processor obtains the inference image, the processor may obtain at least one of a filter or map information from the first neural network model and then may convert the input image into the inference image by using the at least one of the filter or the map information.

When the processor inputs the input image and the correction parameter to the first neural network model, the processor may receive, from a camera included in the computing device, raw images obtained through an image sensor of the camera, generate the input image by using the raw images, and then input the input image and the correction parameter to the first neural network model.

When the processor inputs the input image and the correction parameter to the first neural network mode, the processor may receive raw images from an external device, generate the input image by using the raw images, and then input the input image and the correction parameter to the first neural network model.

Various embodiments may be implemented or supported by one or more computer programs, each of which is formed from computer-readable program code and embodied in a computer-readable medium. The terms "application" and "program" used herein refer to one or more computer programs, software components, sets of instructions, procedures, functions, objects, classes, instances, related data, or a portion thereof adapted for implementation in suitable computer-readable program code. The phrase "computer-readable program code" includes any type of computer code, including source code, object code, and executable code. The phrase "computer-readable medium" may include any type of medium capable of being accessed by a computer, such as read-only memory (ROM), random-access memory (RAM), a hard disk drive, a compact disc (CD), a digital video disc (DVD), or any other type of memory.

Also, a machine-readable storage medium may be provided as a non-transitory storage medium. A "non-transitory storage medium" is a tangible device, and may exclude wired, wireless, optical, or other communication links that transmit transitory electrical or other signals. In this case, "non-transitory" but does not distinguish whether data is semi-permanently or temporarily stored in the storage medium. For example, the "non-transitory storage medium" may include a buffer in which data is temporarily stored. A computer-readable medium may be an arbitrary available medium accessible by a computer, and may include all volatile and non-volatile media and separable and non-separable media. A computer-readable medium includes media where data may be permanently stored and media where data may be stored and later overwritten, such as a rewritable optical disc or an erasable memory device.

Methods according to various embodiments may be provided in a computer program product. The computer program product is a product purchasable between a seller and a purchaser. The computer program product may be distributed in a form of machine-readable storage medium (e.g., a compact disc read-only memory (CD-ROM)), or distributed (e.g., downloaded or uploaded) through an application store or directly or online between two user devices (e.g., smart phones). When distributed online, at least part of the computer program product (e.g., a downloadable application) may be temporarily generated or at least temporarily stored in a machine-readable storage medium, such as a memory of a server of a manufacturer, a server of an application store, or a relay server.

The above description is provided for illustration, and it will be understood by one of ordinary skill in the art that various changes in form and details may be readily made therein without departing from essential features and the scope of the disclosed embodiments as defined by the following claims. For example, the described techniques may be performed in a different order from the described method, and/or the described elements such as a system, structure, device, or circuit may be combined or integrated in a different form from the described method, or may be replaced or substituted by other elements or equivalents to achieve appropriate results. Hence, the embodiments should be considered in descriptive sense only and not for purposes of limitation. For example, each component described as a single type may be implemented in a distributed manner, and similarly, components described as distributed may be implemented in a combined form.

The scope of the disclosed embodiments is defined by the appended claims rather than the detailed description, and all changes or modifications within the scope of the appended claims and their equivalents will be construed as being included in the scope of the disclosed embodiments.

The invention claimed is:

1. A method of correcting an image, the method comprising:

controlling, by a processor of a computing device, the computing device to display an input image and a user interface;

identifying, by the processor, a correction parameter based on a first input received through the user interface, wherein the first input indicates a correction corresponding to the input image;

inputting, by the processor, the input image and the correction parameter to a first neural network model; and obtaining, by the processor, an inference image from the first neural network model, the inference image corresponding to the correction parameter, wherein the first neural network model is a model trained to minimize a difference between the inference image that is output after the input image and the correction parameter are input and a label image corresponding to the correction parameter, wherein the label image corresponding to the correction parameter is an image obtained by, when the correction parameter is applied to at least one image correction algorithm, correcting the input image by using the at least one image correction algorithm, and wherein the first neural network model is trained on a relationship between the correction parameter and the label image so that the inference image output from the first neural network model is controllable by changing the correction parameter.

2. The method of claim 1, wherein a first inference image output from the first neural network model when the input image and a first correction parameter are input to the first neural network model is different from a second inference image output from the first neural network model when the input image and a second correction parameter are input to the first neural network model.

3. The method of claim 1, wherein the correction parameter is a first correction parameter, wherein the inputting the correction parameter comprises:

inputting, by the processor, the input image to a second neural network model;

obtaining, by the processor, the first correction parameter that is inferred by the second neural network model; and inputting, by the processor, the first correction parameter together with the input image to the first neural network model, and wherein the second neural network model is a model trained to minimize a difference between the first correction parameter that is inferred by the second neural network model after the input image is input to the second neural network model and a second correction parameter that allows the label image to have preset image characteristics.

4. The method of claim 3, wherein the second neural network model is trained by:

inputting the input image to the second neural network model;

obtaining the correction parameter output from the second neural network model;

generating the label image by correcting the input image by applying the correction parameter to the at least one image correction algorithm;

obtaining a measured characteristic value that quantifies image characteristics of the label image; and updating the second neural network model to minimize a difference between the measured characteristic value and a preset target characteristic value.

5. The method of claim 1, wherein the inputting the correction parameter comprises:

receiving, by the processor, an input for adjusting the correction parameter through an input/output interface of the computing device;

changing, by the processor, a preset first correction parameter into a second correction parameter, based on the input; and inputting, by the processor, the second correction parameter together with the input image to the first neural network model.

6. The method of claim 5, wherein the obtaining the inference image comprises obtaining, by the processor, an inference image corresponding to the second correction parameter from the first neural network model, wherein the first neural network model is a model trained to minimize a difference between the first inference image output after the input image and the first correction parameter are input and the first label image corresponding to the first correction parameter, and minimize a difference between the second inference image output after the input image and the second correction parameter are input and the second label image corresponding to the second correction parameter, wherein the first label image is an image obtained by, when the first correction parameter is applied to the at least one image correction algorithm, correcting the input image by using the at least one image correction algorithm, and wherein the second label image is an image obtained by, when the second correction parameter is applied to the at least one image correction algorithm, correcting the input image by using the at least one image correction algorithm.

7. The method of claim 1, wherein the first neural network model is trained by:

generating the label image by correcting the input image by applying the correction parameter to the at least one image correction algorithm;

inputting the correction parameter and the input image to the first neural network model;

obtaining the inference image output from the first neural network model; and updating the first neural network model to minimize a difference between the label image and the inference image.

8. The method of claim 1, wherein the inputting the input image and the correction parameter to the first neural network model comprises:

converting, by the processor, the input image into a first gray scale image;

generating, by the processor, a second gray scale image by applying a first parameter included in the correction parameter to the first gray scale image;

generating, by the processor, a third gray scale image by applying a second parameter included in the correction parameter to the first gray scale image; and inputting, by the processor, the second gray scale image and the third gray scale image to the first neural network model.

9. The method of claim 1, wherein the obtaining the inference image comprises:

obtaining, by the processor, at least one of a filter or map information from the first neural network model; and converting, by the processor, the input image into the inference image by using the at least one of the filter or the map information.

10. The method of claim 1, wherein the inputting the input image and the correction parameter to the first neural network model comprises:

receiving, by the processor, from a camera included in the computing device, raw images obtained through an image sensor of the camera;

generating, by the processor, the input image by using the raw images; and inputting, by the processor, the input image and the correction parameter to the first neural network model.

11. The method of claim 1, wherein the inputting of the input image and the correction parameter to the first neural network model comprises:

receiving, by the computing device, raw images from an external device;

generating, by the processor, the input image by using the raw images; and inputting, by the processor, the input image and the correction parameter to the first neural network model.

12. A non-transient computer-readable recording medium having recorded thereon a program for performing a method comprising:

controlling, by a processor of a computing device, the computing device to display an input image and a user interface;

identifying, by the processor, a correction parameter based on a first input received through the user interface, wherein the first input indicates a correction corresponding to the input image;

inputting, by the processor, the input image and the correction parameter to a first neural network model; and obtaining, by the processor, an inference image from the first neural network model, the inference image corresponding to the correction parameter, wherein the first neural network model is a model trained to minimize a difference between the inference image that is output after the input image and the correction parameter are input and a label image corresponding to the correction parameter, wherein the label image is an image obtained by, when the correction parameter is applied to at least one image correction algorithm, correcting the input image by using the at least one image correction algorithm, and wherein the first neural network model is trained on a relationship between the correction parameter and the label image so that the inference image output from the first neural network model is controllable by changing the correction parameter.

13. A computing device comprising:

an input/output interface through which an input is received from a user;

a memory in which a program for performing a method of correcting an input image is stored; and a processor configured to execute the program, wherein the method includes:

controlling the computing device to display the input image and a user interface;

identifying a correction parameter based on a first input received through the user interface, wherein the first input indicates a correction corresponding to the input image;

inputting the input image and the correction parameter to a first neural network model, and obtaining an inference image from the first neural network model, the inference image corresponding to the correction parameter, wherein the first neural network model is a model trained to minimize a difference between the inference image that is output after the input image and the correction parameter are input and a label image corresponding to the correction parameter, wherein the label image corresponding to the correction parameter is an image obtained by, when the correction parameter is applied to at least one image correction algorithm, correcting the input image by using the at least one image correction algorithm, and wherein the first neural network model is trained on a relationship between the correction parameter and the label image so that the inference image output from the first neural network model is controllable by changing the correction parameter.

14. The computing device of claim 13, wherein a first inference image output from the first neural network model when the input image and a first correction parameter are input to the first neural network model is different from a second inference image output from the first neural network model when the input image and a second correction parameter are input to the first neural network model.

15. The computing device of claim 13, wherein the correction parameter is a first correction parameter, wherein, the inputting the correction parameter includes:

inputting, by the processor, the input image to a second neural network model, obtaining, by the processor, the first correction parameter that is inferred by the second neural network model, and inputting the first correction parameter together with the input image to the first neural network model, and wherein the second neural network model is a model trained to minimize a difference between the first correction parameter that is inferred by the second neural network model after the input image is input and a second correction parameter that allows the label image to have preset image characteristics.

16. The computing device of claim 15, wherein the second neural network model is trained by:

inputting the input image to the second neural network model, obtaining the correction parameter output from the second neural network model, generating the label image by correcting the input image by applying the first correction parameter to the at least one image correction algorithm, obtaining a measured characteristic value that quantifies image characteristics of the label image, and updating the second neural network model to minimize a difference between the measured characteristic value and a preset target characteristic value.

17. The computing device of claim 13, wherein the inputting the correction parameter includes:

receiving, by the processor, an input for adjusting the correction parameter through the input/output interface, changing, by the processor, a preset first correction parameter into a second correction parameter based on the input, and inputting, by the processor, the second correction parameter together with the input image to the first neural network model.

18. The computing device of claim 17, wherein the obtaining the inference image includes obtaining by the processor, an inference image corresponding to the second correction parameter from the first neural network model, wherein the first neural network model is a model trained to minimize a difference between the first inference image output after the input image and the first correction parameter are input and the first label image corresponding to the first correction parameter, and minimize a difference between the second inference image output after the input image and the second correction parameter are input and the second label image corresponding to the second correction parameter, wherein the first label image is an image obtained by, when the first correction parameter is applied to the at least one image correction algorithm, correcting the input image by using the at least one image correction algorithm, and wherein the second label image is an image obtained by, when the second correction parameter is applied to the at least one image correction algorithm, correcting the input image by using the at least one image correction algorithm.

19. The computing device of claim 13, wherein the first neural network model is trained by:

generating the label image by correcting the input image by applying the correction parameter to the at least one image correction algorithm, inputting the correction parameter and the input image to the first neural network model, obtaining the inference image output from the first neural network model, and updating the first neural network model to minimize a difference between the label image and the inference image.

20. The computing device of claim 13, wherein the inputting the input image and the correction parameter to the first neural network model includes:

converting, by the processor, the input image into a first gray scale image, generating, by the processor, a second gray scale image by applying a first parameter included in the correction parameter to the first gray scale image, generating, by the processor, a third gray scale image by applying a second parameter included in the correction parameter to the first gray scale image, and inputting, by the processor, the input image, the second gray scale image and the third gray scale image to the first neural network model.

\* \* \* \* \*